(12) United States Patent
Xue et al.

(10) Patent No.: US 11,127,214 B2
(45) Date of Patent: Sep. 21, 2021

(54) CROSS LAYER TRAFFIC OPTIMIZATION FOR SPLIT XR

(71) Applicant: QUALCOMM Incorporated, San Diego, CA (US)

(72) Inventors: Qi Xue, San Diego, CA (US); Maksim Krasnyanskiy, San Diego, CA (US); Bibhu Mohanty, Del Mar, CA (US); Ajit Venkat Rao, Bangalore (IN); Serafin Diaz Spindola, San Diego, CA (US); Bojan Vrcelj, San Diego, CA (US); Sandeep Kanakapura Lakshmikantha, Ramanagar District (IN)

(73) Assignee: QUALCOMM Incorporated, San Diego, CA (US)

( * ) Notice: Subject to any disclaimer, the term of this patent is extended or adjusted under 35 U.S.C. 154(b) by 25 days.

(21) Appl. No.: 16/572,017

(22) Filed: Sep. 16, 2019

(65) Prior Publication Data

US 2020/0098186 A1  Mar. 26, 2020

(30) Foreign Application Priority Data

Sep. 17, 2018 (IN) .............................. 201841034992

(51) Int. Cl.
*G06T 19/00* (2011.01)
*G06F 3/01* (2006.01)

(52) U.S. Cl.
CPC ............ *G06T 19/006* (2013.01); *G06F 3/011* (2013.01)

(58) Field of Classification Search
None
See application file for complete search history.

(56) References Cited

U.S. PATENT DOCUMENTS

| 10,128,966 B1* | 11/2018 | Chu ...................... H04B 17/345 |
| 2005/0213593 A1* | 9/2005 | Anderson ............... H04L 69/18 |
| | | 370/419 |
| 2006/0057968 A1* | 3/2006 | Ohtani .................. H04L 12/403 |
| | | 455/67.16 |
| 2007/0286243 A1* | 12/2007 | Olshansky ......... H04N 21/2365 |
| | | 370/498 |
| 2008/0074415 A1* | 3/2008 | Woo ...................... G06T 15/005 |
| | | 345/419 |

(Continued)

FOREIGN PATENT DOCUMENTS

| CN | 106454322 A | 2/2017 |
| CN | 104346041 B * | 4/2018 |
| JP | 2017050735 A | 3/2017 |

OTHER PUBLICATIONS

International Search Report and Written Opinion—PCT/US2019/051427—ISA/EPO—dated Oct. 29, 2019.

*Primary Examiner* — Sultana M Zalalee
(74) *Attorney, Agent, or Firm* — Campbell C. Chiang

(57) ABSTRACT

An improved wireless split rendering system for displaying Extended Reality (XR) content is discussed. A rendering server and client head-mounted device (HMD) may communicate over a wireless medium, where communication control is given to a server application layer logic. This allows the server to use request pose information from the HMD only when needed for rendering, while preserving bandwidth on the wireless medium for transmitting frames of the rendered content. This reduces contention and improves channel efficiency.

24 Claims, 13 Drawing Sheets

(56) References Cited

U.S. PATENT DOCUMENTS

| | | | |
|---|---|---|---|
| 2008/0095124 A1* | 4/2008 | Ramos | H04L 47/2416 370/336 |
| 2012/0163684 A1* | 6/2012 | Natanzon | G16H 30/20 382/128 |
| 2013/0097170 A1* | 4/2013 | Flanagan | G06F 3/067 707/737 |
| 2014/0010211 A1* | 1/2014 | Asterjadhi | H04W 72/0446 370/336 |
| 2014/0185559 A1* | 7/2014 | Grandhi | H04W 48/14 370/329 |
| 2015/0124690 A1* | 5/2015 | Merlin | H04W 72/005 370/312 |
| 2015/0146654 A1* | 5/2015 | Chu | H04L 1/1621 370/329 |
| 2016/0183292 A1* | 6/2016 | Trainin | H04W 72/1278 370/336 |
| 2017/0064741 A1* | 3/2017 | Zhou | H04W 74/0816 |
| 2017/0075416 A1* | 3/2017 | Armstrong | H04L 65/1063 |
| 2017/0085695 A1* | 3/2017 | Giesner | H04W 84/20 |
| 2017/0278262 A1* | 9/2017 | Kawamoto | G06F 3/012 |
| 2017/0332414 A1* | 11/2017 | Kneckt | H04L 47/2441 |
| 2017/0346914 A1* | 11/2017 | Cheung | H04L 67/306 |
| 2018/0091791 A1 | 3/2018 | Jiang et al. | |
| 2018/0220119 A1 | 8/2018 | Horvitz et al. | |
| 2018/0262315 A1* | 9/2018 | Chun | H04W 84/12 |
| 2019/0164518 A1* | 5/2019 | Dimitrov | G02B 27/017 |

\* cited by examiner

CROSS LAYER TRAFFIC OPTIMIZATION FOR SPLIT XR

This application claims the benefit of Indian Provisional Application No. 201841034992, filed Sep. 17, 2018, the entire content of which is incorporated by reference herein.

TECHNICAL FIELD

The disclosure relates to processing of image content information and, more particularly, processing of split rendering content for output to a display.

BACKGROUND

Split rendered systems may include at least one host device and at least one client device that communicate over a network (e.g., a wireless network, wired network, etc.). The host device acts as a wireless access point and sends image content information, which may include audio video (AV) data, audio data, and/or video data, to one or more client devices participating in a particular group communication session using one or more wireless communication standards, e.g., IEEE 802.11. The image content information may be played back at the client devices. More specifically, each of the participating client devices processes the received image content information for presentation on its display screen and audio equipment. In addition, the host device may perform at least some processing of the image content information for presentation on the client devices.

The host device and one or more of the client devices may be either wireless devices or wired devices with wireless communication capabilities. In one example, as wired devices, one or more of the host device and the client devices may comprise televisions, monitors, projectors, set-top boxes, DVD or Blu-Ray Disc players, digital video recorders, laptop or desktop personal computers, video game consoles, and the like, that include wireless communication capabilities. In another example, as wireless devices, one or more of the host device and the client devices may comprise mobile telephones, portable computers with wireless communication cards, personal digital assistants (PDAs), portable media players, or other flash memory devices with wireless communication capabilities, including so-called "smart" phones and "smart" pads or tablets, or other types of wireless communication devices (WCDs).

In some examples, at least one of the client devices may comprise a wearable display device. A wearable display device may comprise any type of wired or wireless display device that is worn on a user's body. As an example, the wearable display device may comprise a wireless head-worn display or wireless head-mounted display (WHMD) that is worn on a user's head in order to position one or more display screens in front of the user's eyes. The host device is typically responsible for performing at least some processing of the image content information for display on the wearable display device. The wearable display device is typically responsible for preparing the image content information for display at the wearable display device.

SUMMARY

In one example embodiment, a method of rendering frames for display to a user is discussed. The method includes initiating a wireless connection with a server. The method includes determining a pose information of the user. The method includes, responsive to receiving a trigger packet from the server, transmitting the pose information to the server over the wireless connection. The method includes receiving a rendered frame from the server over the wireless connection, the rendered frame rendered for display based on the transmitted pose information. The method includes displaying the received rendered frame to the user. The transmitted pose information may be a 6 degrees of freedom (6 DoF) pose. The method may include executing asynchronous time warping (ATW) on the received rendered frame based on a latest pose information before displaying to the user. The wireless connection may be a WiFi Reverse Direction Grant mode connection and the server is an Access Point (AP) on a WiFi network. The method may include transmitting the pose information after a predetermined period of time if no trigger packet is received. The rendered frame may be a first view of a three-dimensional Virtual Reality (VR) or Augmented Reality (AR) content for display to the user. The trigger packet may be transmitted at a regular interval. The trigger packet may be transmitted responsive to determining there is no rendered frame to transmit. The trigger packet may be transmitted responsive to needing the pose information to render the frame. The trigger packet may be initiated by an application layer module executing on the server.

In another example embodiment, an apparatus for rendering frames for display to a user is discussed. The apparatus includes a wireless communication module for initiating a wireless connection with a server and receive a trigger packet. The apparatus includes a sensor for determining a pose information of the user. The apparatus includes a processor configured to, responsive to receiving the trigger packet from the server, transmitting the pose information to the server over the wireless connection, receive a rendered frame from the server over the wireless connection, the rendered frame rendered for display based on the transmitted pose information. The apparatus includes a display for displaying the received rendered frame to the user. The transmitted pose information is a 6 degrees of freedom (6 DoF) pose. Wherein the processor is further configured to execute asynchronous time warping (ATW) on the received rendered frame based on a latest pose information before displaying to the user. The wireless connection is a WiFi Reverse Direction Grant mode connection and the server is an Access Point (AP) on a WiFi network. The processor further configured to transmit the pose information after a predetermined period of time if no trigger packet is received. The rendered frame is a first view of a three-dimensional Virtual Reality (VR) or Augmented Reality (AR) content for display to the user. The trigger packet is transmitted at a regular interval. The trigger packet is transmitted responsive to determining there is no rendered frame to transmit. The trigger packet is transmitted responsive to needing the pose information to render the frame. The trigger packet is initiated by an application layer module executing on the server.

In another example embodiment, an apparatus for rendering frames for display to a user. The apparatus includes a wireless communication means for initiating a wireless connection with a server and receive a trigger packet. The apparatus includes a sensor means for determining a pose information of the user. The apparatus includes a processor means for processing, configured to, responsive to receiving the trigger packet from the server, transmitting the pose information to the server over the wireless connection, receive a rendered frame from the server over the wireless connection, the rendered frame rendered for display based on the transmitted pose information; and a display means for displaying the received rendered frame to the user. The transmitted pose information is a 6 degrees of freedom (6 DoF) pose. The processor means further configured to execute asynchronous time warping (ATW) on the received rendered frame based on a latest pose information before displaying to the user. The wireless connection is a WiFi Reverse Direction Grant mode connection and the server is an Access Point (AP) on a WiFi network. The processor means further configured to transmit the pose information after a predetermined period of time if no trigger packet is received. The rendered frame is a first view of a three-dimensional Virtual Reality (VR) or Augmented Reality (AR) content for display to the user. The trigger packet is transmitted at a regular interval. The trigger packet is transmitted responsive to determining there is no rendered frame to transmit. The trigger packet is transmitted responsive to needing the pose information to render the frame. The trigger packet is initiated by an application layer module executing on the server.

In another example embodiment, a non-transitory computer-readable storage medium storing instructions that, when executed, cause one or more processors to execute a method. The method includes, responsive to receiving a trigger packet from the server, transmitting the pose information to the server over the wireless connection. The method includes receiving a rendered frame from the server over the wireless connection, the rendered frame rendered for display based on the transmitted pose information. The method includes displaying the received rendered frame to the user. The transmitted pose information may be a 6 degrees of freedom (6 DoF) pose. The method may include executing asynchronous time warping (ATW) on the received rendered frame based on a latest pose information before displaying to the user. The wireless connection may be a WiFi Reverse Direction Grant mode connection and the server is an Access Point (AP) on a WiFi network. The method may include transmitting the pose information after a predetermined period of time if no trigger packet is received. The rendered frame may be a first view of a three-dimensional Virtual Reality (VR) or Augmented Reality (AR) content for display to the user. The trigger packet may be transmitted at a regular interval. The trigger packet may be transmitted responsive to determining there is no rendered frame to transmit. The trigger packet may be transmitted responsive to needing the pose information to render the frame. The trigger packet may be initiated by an application layer module executing on the server.

The details of one or more examples of the disclosure are set forth in the accompanying drawings and the description below. Other features, objects, and advantages will be apparent from the description, drawings, and claims.

DETAILED DESCRIPTION

Split rendering systems may divide rendering of Extended Reality (XR) content such as Virtual Reality (VR) or Augmented Reality (AR) content between a server and a client. For example, the server may handle frame rendering while a client head-mounted display (HMD) handles 6 degrees of freedom (6 DoF) pose tracking of a user. The server and HMD may communicate over a WiFi Reverse Direction Grant (RDG) mode link, where communication control is given to a server application layer logic. This allows the server to use WiFi uplink (UL) traffic from the HMD for pose information only when needed for rendering, while preserving bandwidth on the WiFi downlink (DL) for transmitting frames of the rendered content. This reduces contention and improves channel efficiency.

It will be appreciated that imaging systems may generate a 360-degree image (e.g., canvas) for displaying video. For example, an imaging system may output a portion of the canvas that is in a user's field of view at a virtual reality (VR) headset.

Some imaging systems may be split rendered. An example split rendered system may include a host device or server (e.g., computer, cloud, etc.) that generates a compressed rendered video buffer (and a compressed rendered audio buffer) and a client device (e.g., a head-mounted display (HMD)) that decompresses the compressed rendered video buffer (and audio buffer) for display at the client device.

In virtual reality applications, a user wears the HMD device that includes processing circuitry to receive, decode, process, and display image content. The image content that the HMD device receives is based on the pose information (e.g., pitch, roll, and yaw) of the HMD device. For instance, the HMD device sends pose information to a server (e.g., host device) relatively frequently, and in some cases, continuously. The server, based on the pose information, encodes and transmits image content that would be viewable from the particular pose of the HMD device.

Circuitry on the HMD (e.g., a video decoder or a GPU) receives the image content and reconstructs the image content to generate a frame. The circuitry may repeat such operations to generate a plurality of frames, which form the video that is displayed. However, in some cases, image content information may be lost in transmission or there may be too many errors for proper reconstruction of portions of a frame. The term "lost" is used generically to refer to the case where the image content information is not received and the case where the image content is received but is too corrupted for image reconstruction. The phrase "missing image content" is used similarly as well to refer to the image content that is missing in transmission or corrupted.

Figure 1:
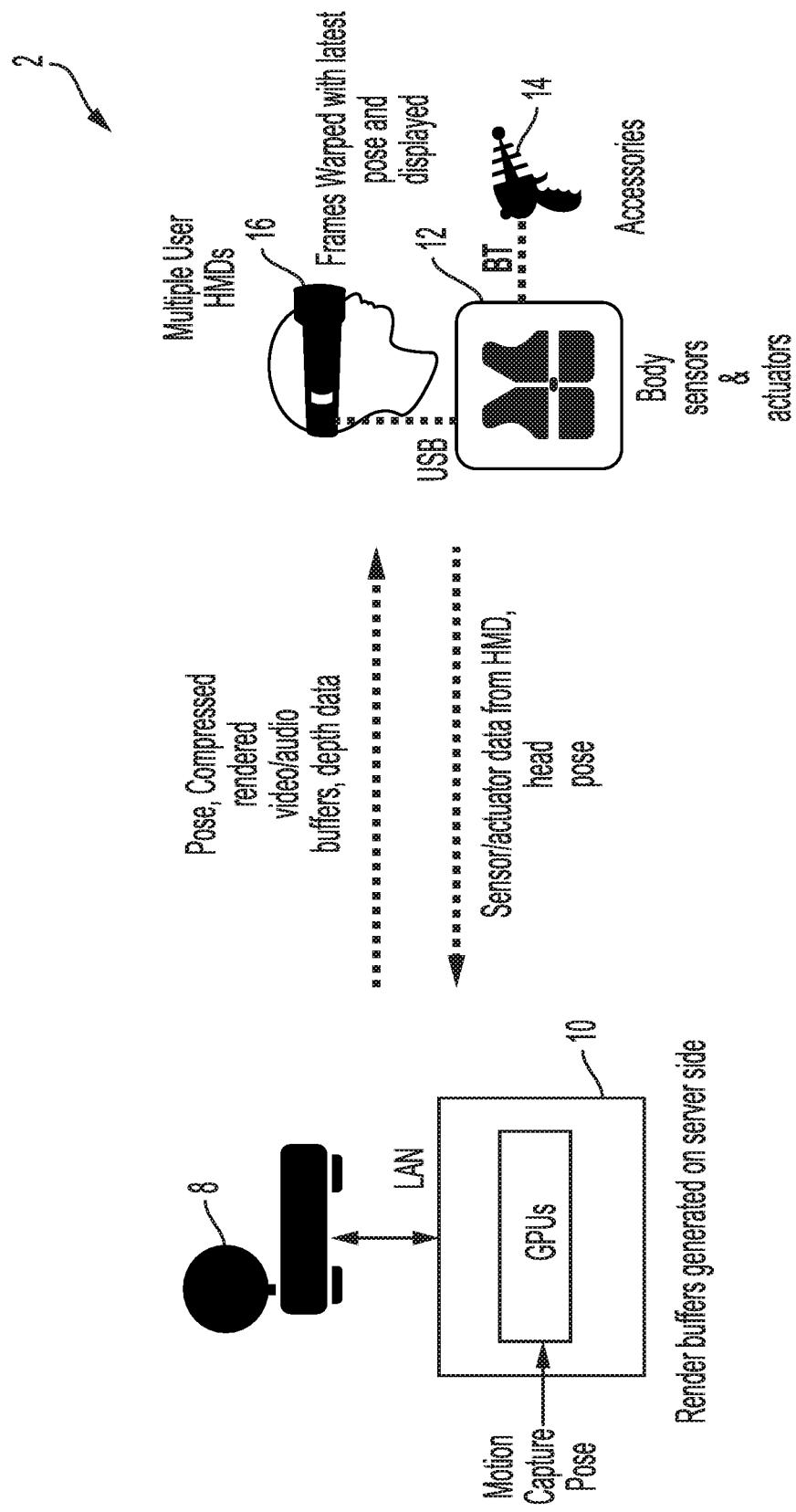
FIG. 1 is a block diagram illustrating a split rendered system including a host device and a wearable display device.

FIG. 1 is a block diagram illustrating split rendered system 2 including a host device 10 and wearable display device 16. In the example of FIG. 1, split rendered system 2 includes host device 10 and only one client device, i.e., wearable display device 16. In other examples, split rendered system 2 may include additional client devices (not shown), which may comprise wearable display devices, wireless devices or wired devices with wireless communication capabilities.

In some examples, split rendered system 2 may conform to the Wi-Fi Direct (WFD) standard defined by the Wi-Fi Alliance. The WFD standard enables device-to-device communication over Wi-Fi networks, e.g., wireless local area networks, in which the devices negotiate their roles as either access points or client devices. Split rendered system 2 may include one or more base stations (not shown) that support a plurality of wireless networks over which a peer-to-peer (P2P) group communication session may be established between host device 10, wearable display device 16, and other participating client devices. A communication service provider or other entity may centrally operate and administer one or more of these wireless networks using a base station as a network hub.

According to the WFD standard, host device 10 may act as a wireless access point and receive a request from wearable display device 16 to establish a P2P group communication session. For example, host device 10 may establish the P2P group communication session between host device 10 and wearable display device 16 using the Real-Time Streaming Protocol (RTSP). The P2P group communication session may be established over a wireless network, such as a Wi-Fi network that uses a wireless communication standard, e.g., IEEE 802.11a, 802.11g, or 802.11n improvements to previous 802.11 standards.

Once the P2P group communication session is established, host device 10 may send image content information, which may include audio video (AV) data, audio data, and/or video data, to wearable display device 16, and any other client devices, participating in the particular P2P group communication session. For example, host device 10 may send the image content information to wearable display device 16 using the Real-time Transport protocol (RTP). The image content information may be played back at display screens of wearable display device 16, and possibly at host device 10 as well. It should be understood that display of content at host device 10 is merely one example, and is not necessary in all examples.

For instance, in a gaming application, host device 10 may be a server receiving information from each of multiple users, each wearing an example wearable display device 16. Host device 10 may selective transmit different image content to each one of devices like wearable display device 16 based on the information that host device 10 receives. In such examples, there may be no need for host device 10 to display any image content.

Wearable display device 16 may process the image content information received from host device 10 for presentation on its display screens and audio equipment. Wearable display device 16 may perform these operations with a computer processing unit and graphics processing unit that are limited by size and weight in order to fit within the structure of a handheld device. In addition, host device 10 may perform at least some processing of the image content information for presentation on wearable display device 16.

A user of wearable display device 16 may provide user input via an interface, such as a human interface device (HID), included within or connected to wearable display device 16. An HID may comprise one or more of a touch display, an input device sensitive to an input object (e.g., a finger, stylus, etc.), a keyboard, a tracking ball, a mouse, a joystick, a remote control, a microphone, or the like. As shown, wearable display device 16 may be connected to one or more body sensors and actuators 12 via universal serial bus (USB), and body sensors and actuators 12 may be connected to one or more accessories 14 via Bluetooth™.

Wearable display device 16 sends the provided user input to host device 10. In some examples, wearable display device 16 sends the user input over a reverse channel architecture referred to as a user input back channel (UIBC). In this way, host device 10 may respond to the user input provided at wearable display device 16. For example, host device 10 may process the received user input and apply any effect of the user input on subsequent data sent to wearable display device 16.

Host device 10 may be either a wireless device or a wired device with wireless communication capabilities. In one example, as a wired device, host device 10 may comprise one of a television, monitor, projector, set-top box, DVD or Blu-Ray Disc player, digital video recorder, laptop or desktop personal computer, video game console, and the like, that includes wireless communication capabilities. Other examples of host device 10 are possible.

For example, host device 10 may be a file server that stores image content, and selectively outputs image content based on user input from display device 16. For instance, host device 10 may store 360-degree video content, and based on user input may output selected portions of the 360-degree video content. In some examples, the selected portions of the 360-degree video content may be pre-generated and pre-stored video content. In some examples, host device 10 may generate the image content on-the-fly using the high end graphics processing units (GPUs) illustrated in FIG. 1 and described in more detail below in all examples. In examples where host device 10 transmits pre-stored video content, host device 10 need not necessarily include the GPUs. Host device 10 may be proximate to wearable display device 16 (e.g., in the same room), or host device 10 and wearable display device 16 may be in different locations.

As shown, host device 10 may be connected to a router 8 and then connects to the (e.g., the Internet) via a local area network (LAN). In another example, as a wireless device, host device 10 may comprise one of a mobile telephone, portable computer with a wireless communication card, personal digital assistant (PDA), portable media player, or other flash memory device with wireless communication capabilities, including a so-called "smart" phone and "smart" pad or tablet, or another type of wireless communication device (WCD).

Wearable display device 16 may comprise any type of wired or wireless display device that is worn on a user's body. As an example, wearable display device 16 may comprise a head-worn display or a head-mounted display (HMD) that is worn on a user's head in order to position one or more display screens in front of the user's eyes. In general, the display screens of wearable display device 16 may comprise one of a variety of display screens such as a liquid crystal display (LCD), a plasma display, an organic light emitting diode (OLED) display, or another type of display screen.

In one example, wearable display device 16 may comprise a HMD device formed as glasses that include display screens in one or more of the eye lenses, and also include a nose bridge and temple arms to be worn on a user's face. As another example, wearable display device 16 may comprise a HMD device formed as goggles that includes display screens in separate eye lenses or a single display screen, and that also includes at least one strap to hold the goggles on the user's head. Although wearable display device 16 is primarily described in this disclosure as being a HMD, in other examples wearable display device 16 may comprise display devices that are worn on other portions of the user's body, such as on the user's neck, shoulders, arm or wrist. In an alternative embodiment, the device 16 may be a mobile handset or other device.

In the example of FIG. 1, wearable display device 16 outputs sensor and/or actuator data to host device 10. The sensor and/or actuator data may include eye pose data indicating a user's field of view and/or pose of wearable display device 16. In response to receiving the sensor and/or actuator data, host device 10 generates image content information for rendering a frame. For example, host device 10 may generate a compressed video and audio buffer using eye and device pose data indicated by the sensor and/or actuator data.

In some examples, the transmission from host device 10 to wearable display device 16 may be lossy. For example, the image content information that host device 10 transmits may be not the exact same image content information that wearable display device 16 receives. The image content information may be dropped in transmission or there may be enough errors in the image content information that image content information is unusable.

Such transmission errors result in wearable display device 16 being unable to reconstruct an entire image frame. There may be gaps in the reconstructed image frame due to the error-filed or generally lost image content information (e.g., lost image content information referring to error-filed or not received image content). As an example, host device 10 may packetize the image content information of a frame as image content information for a plurality of separately decodable slices. If image content information for a slice is lost (e.g., not received or error-filed), then host device 10 may not be able to reconstruct the image content of that slice.

Figure 2:
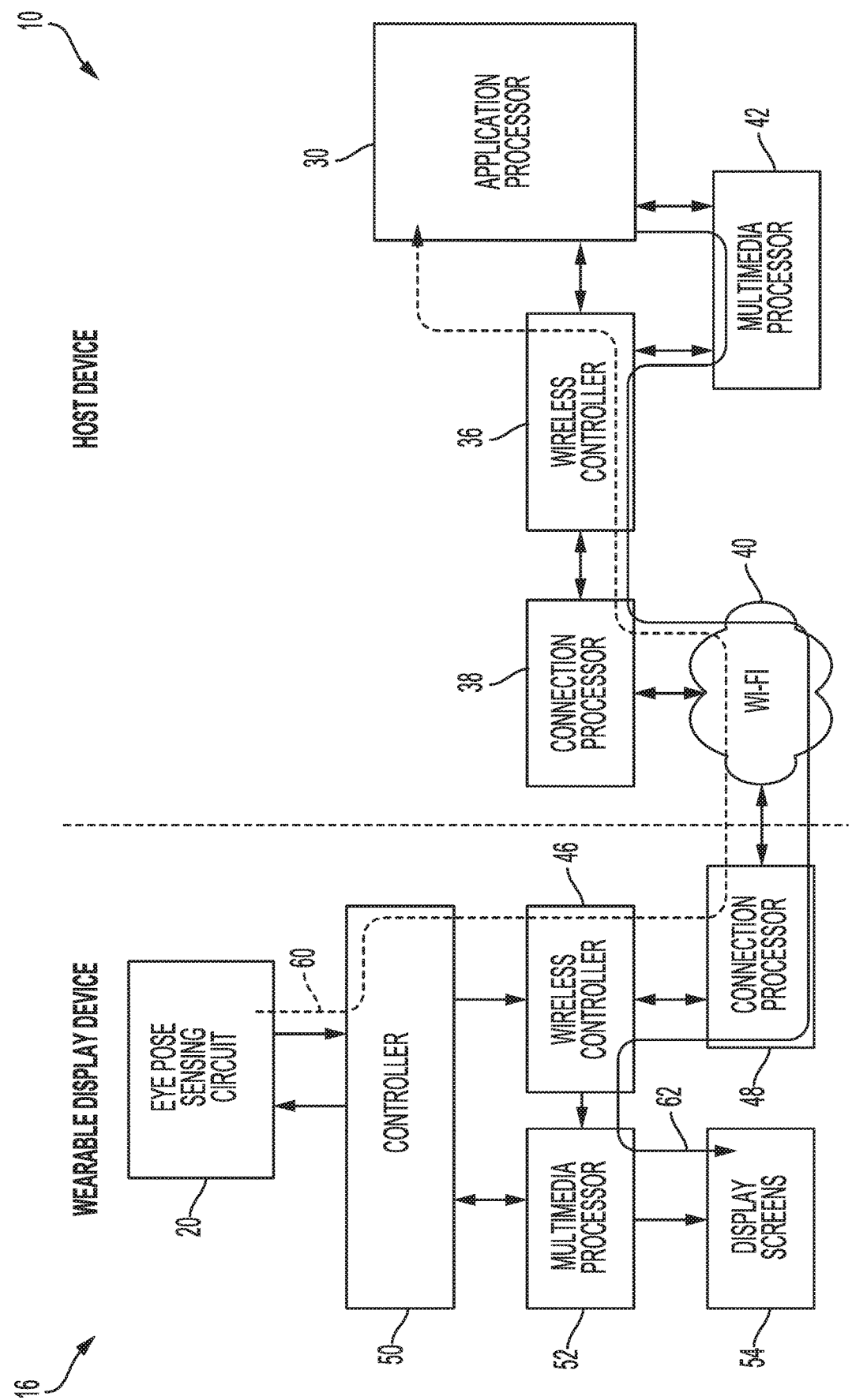
FIG. 2 is a block diagram illustrating the host device and wearable display device from FIG. 1 in greater detail.

FIG. 2 is a block diagram illustrating host device 10 and wearable display device 16 from FIG. 1 in greater detail. For purposes of this disclosure, host device 10 and wearable display device 16 will primarily be described as being wireless devices. For example, host device 10 may comprise a server, a smart phone or smart pad, or other handheld WCD, and wearable display device 16 may comprise a WHMD device. In other examples, however, host device 10 and wearable display device 16 may comprise either wireless devices or wired devices with wireless communication capabilities.

In the example illustrated in FIG. 2, host device 10 includes circuitry such as an application processor 30, a wireless controller 36, a connection processor 38, and a multimedia processor 42. Host device 10 may comprise additional circuitry used to control and perform operations described in this disclosure.

Application processor 30 may comprise a general-purpose or a special-purpose processor that controls operation of host device 10. As an example, application processor 30 may execute a software application based on a request from wearable display device 16. In response, application processor 30 may generate image content information. An example of a software application that application processor 30 executes is a gaming application. Other examples also exist such as a video playback application, a media player application, a media editing application, a graphical user interface application, a teleconferencing application or another program. In some examples, a user may provide input to host device 10 via one or more input devices (not shown) such as a keyboard, a mouse, a microphone, a touch pad or another input device that is coupled to host device 10 to cause host device 10 to execute the application.

The software applications that execute on application processor 30 may include one or more graphics rendering instructions that instruct multimedia processor 42, which includes the high end GPU illustrated in FIG. 1, to cause the rendering of graphics data. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, application processor 30 may issue one or more graphics rendering commands to multimedia processor 42 to cause multimedia processor 42 to perform some or all of the rendering of the graphics data. In some examples, the graphics data to be rendered may include a list of graphics primitives, e.g., points, lines, triangles, quadrilaterals, triangle strips, etc.

Multimedia processor 42 may generate image content for many different perspectives (e.g., viewing angles). Therefore, multimedia processor 42 may include a GPU that is capable of performing operations to generate image content for many different perspectives in a relatively short amount of time.

As illustrated in FIG. 2, wearable display device 16 includes eye pose sensing circuit 20, wireless controller 46, connection processor 48, controller 50, multimedia processor 52, and display screens 54. Controller 50 comprises a main controller for wearable display device 16, and controls the overall operation of wearable display device 16.

Controller 50 may comprise fixed function circuitry or programmable circuitry, examples of which include a general-purpose or a special-purpose processor that controls operation of wearable display device 16. A user may provide input to wearable display device 16 to cause controller 50 to execute one or more software applications. The software applications that execute on controller 50 may include, for example, a gaming application, an operating system, a word processor application, an email application, a spread sheet application, a media player application, a media editing application, a graphical user interface application, a teleconferencing application or another program. The user may provide input to wearable display device 16 via one or more input devices (not shown) such as a keyboard, a mouse, a microphone, a touch pad or another input device that is coupled to wearable display device 16.

The software applications that execute on controller 50 may include one or more graphics rendering instructions that instruct multimedia processor 52 to cause the rendering of graphics data. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, application controller 50 may issue one or more graphics rendering commands to multimedia processor 52 to cause multimedia processor 52 to perform some or all of the rendering of the graphics data. In some examples, the graphics data to be rendered may include a list of graphics primitives, e.g., points, lines, triangles, quadrilaterals, triangle strips, etc.

Display screens 54 may include a monitor, a television, a projection device, a liquid crystal display (LCD), a plasma display panel, a light emitting diode (LED) array, electronic paper, a surface-conduction electron-emitted display (SED), a laser television display, a nanocrystal display or another type of display unit. Display screens 54 may be integrated within wearable display device 16. For instance, display screens 54 may be a screen of a mobile telephone handset or a tablet computer. Alternatively, display screens 54 may be a stand-alone device coupled to wearable display device 16 via a wired or wireless communications link.

Eye pose sensing circuit 20 may include sensors and/or actuators for generating information indicative of a user's field of view. For example, eye pose sensing circuit 20 may generate eye pose data (e.g., via accelerometers, eye-tracking circuitry, and the like) that indicates an angle of rotation of wearable display device 16 and a position of wearable display device 16.

As shown, the transfer of eye pose data from wearable display device 16 to host device 10 is illustrated as a path 60. Specifically, controller 50 may receive eye pose data from eye pose sensing circuit 20. Multimedia processor 52 may receive eye pose data from controller 50. Wireless controller 46 packages the eye pose data, and connection processor 48 transmits the packaged user input over a wireless network, such as Wi-Fi network 40, to host device 10. At host device 10, connection processor 38 receives the transmitted eye pose data, and wireless controller 36 unpackages the received user input for processing by multimedia processor 42. In this way, host device 10 may generate image content for a particular eye pose of a user's field of view.

In general, host device 10 generates image content information for presentation at display screens 54. More specifically, multimedia processor 42 may generate image content information for a user's field of view that is indicated by eye pose data generated by eye pose sensing circuit 20. For example, multimedia processor 42 may generate image content information that indicates one or more primitives arranged in a user's field of view that is indicated by eye pose data generated by eye pose sensing circuit 20. In some examples, multimedia processor 42 may generate image content information that indicates a two-dimensional frame representative of the user's field of view.

Multimedia processor 42 may then encode the frames of image content to generate a bitstream of image content information for transmission to wearable display device 16. Multimedia processor 42 may encode the frames using any one of various video coding techniques such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards.

In the example of FIG. 2, wearable display device 16 may receive, via path 62, image content information from host device 10. To transfer image content information from host device 10 to wearable display device 16, path 62 may begin at application processor 30.

Application processor 30 provides an environment in which a variety of applications may run on host device 10. Application processor 30 may receive data for use by these applications from internal or external storage location and/or internal or external sensors or cameras associated with host device 10. The applications running on application processor 30, in turn, generate image content information for presentation to a user of host device 10 and/or wearable display device 16. In other examples, path 62 may begin at multimedia processor 42 or some other functional device that either generates image content information or receives image content information directly from the storage locations and/or sensors or cameras.

Multimedia processor 42 may process the received image content information for presentation on display screens 54 of wearable display device 16. Wireless controller 36 packages the processed data for transmission. Packaging the processed data may include grouping the data into packets, frames or cells that may depend on the wireless communication standard used over Wi-Fi network 40. Connection processor 38 then transmits the processed data to wearable display device 16 using Wi-Fi network 40. Connection processor 38 manages the connections of host device 10, including a P2P group communication session with wearable display device 16 over Wi-Fi network 40, and the transmission and receipt of data over the connections.

The transfer of the image content information continues along path 62 at wearable display device 16 when connection processor 48 receives the transmitted data from host device 10. Similar to connection processor 38 of host device 10, connection processor 48 of wearable display device 16 manages the connections of wearable display device 16, including a P2P group communication session with host device 10 over Wi-Fi network 40, and the transmission and receipt of data over the connections. Wireless controller 46 unpackages the received data for processing by multimedia processor 52.

The image content information that multimedia processor 52 receives includes information indicating the pose with which a frame is associated. Multimedia processor 52 may also receive information such as prediction modes, motion vectors, residual data and the like for decoding the encoded image content (e.g., for decoding blocks of a frame of image content). As an example, a frame may include a plurality of individually decodable slices. Multimedia processor 52 may receive image content information such as prediction modes, motion vectors, and residual data for blocks within each of the slices.

There may be various ways in which multimedia processor 52 receives information indicating the pose with which a frame is associated. As one example, each packet/slice includes the rendering pose in a field such as the Real-time Transport Protocol (RTP) header. As another example, the RTP header may include a time stamp of a pose, rather than the actual pose information. In such examples, multimedia processor 52 may store, in a buffer, time stamps of different poses determined by eye pose sensing circuit 20. Multimedia processor 52 may then determine the pose information associate with the frame based on the received time stamp and the time stamps stored in the buffer (e.g., the received time stamp is an entry in the buffer of pose information to determine the pose information associated with the frame). Other ways to indicate the pose associated with a frame are possible.

In the example techniques described in this disclosure, multimedia processor 52 may use the pose information of frames to warp image content to fill in portions of a frame that could not be reconstructed. Such filling of portions of the frame may be for error concealment or as part of constructing the frame.

For example, along path 62, such as at the output of connection processor 38, the output of Wi-Fi network 40, output of connection processor 48, and/or output of wireless controller 46, there may be loss of packets or there may be errors in the packets such that multimedia processor 52 cannot reconstruct the image content included into those packets. Multimedia processor 52 may substitute image content from warped image content of a previous frame for the missing image content of the current frame (e.g., portions of the current frame multimedia processor 52 could not reconstruct).

For instance, multimedia processor 52 may determine which portions of the current frame cannot be reconstructed (e.g., due to dropped information or errors in the bitstream). Multimedia processor 52 may also generate warped image content based on the pose information of the current frame and a previous frame. Multimedia processor 52 may then copy the warped image content into the current frame.

Figure 3:
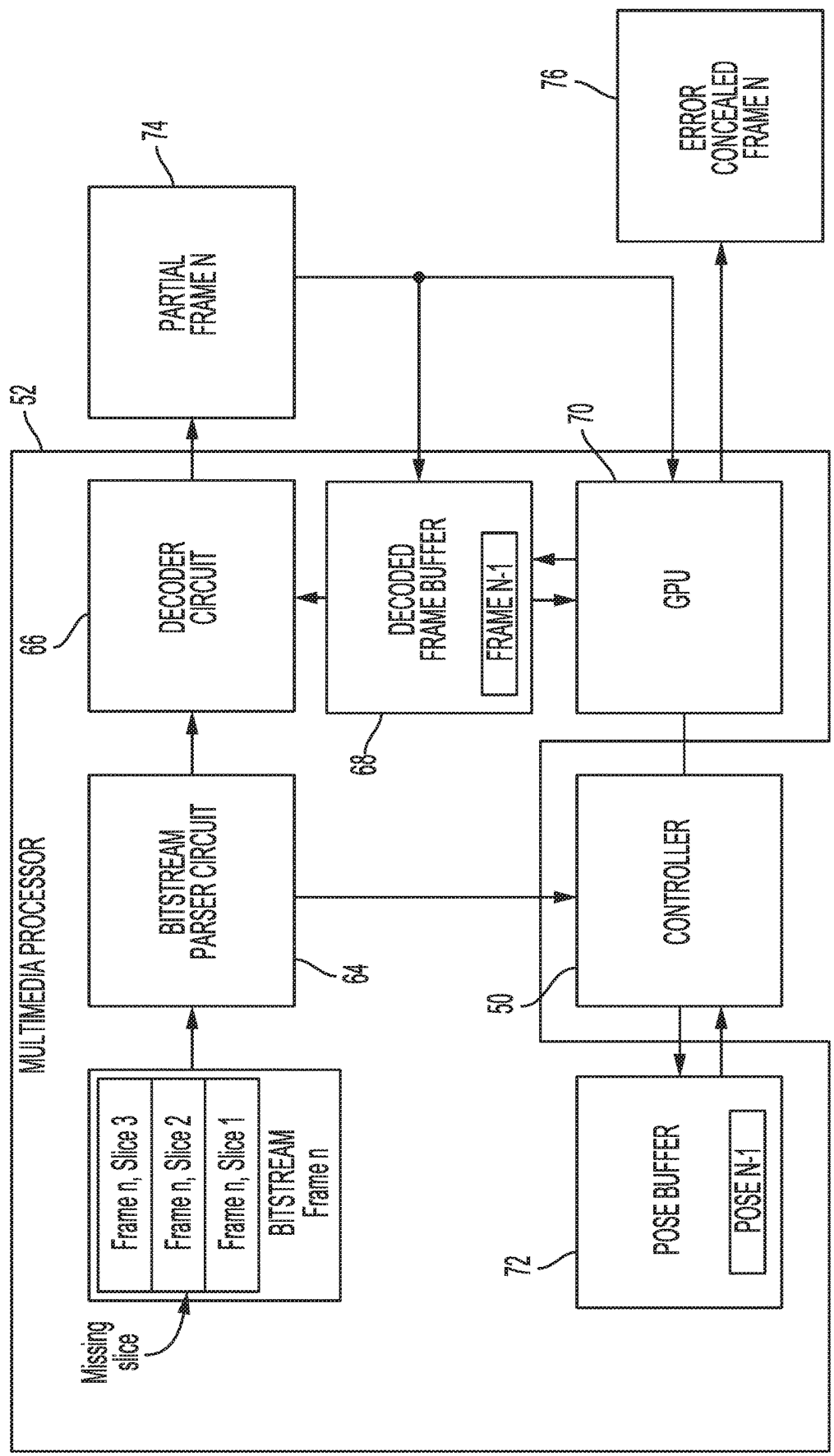
FIG. 3 is a block diagram illustrating an example of the multimedia processor of FIG. 2 in greater detail.
Figure 4:
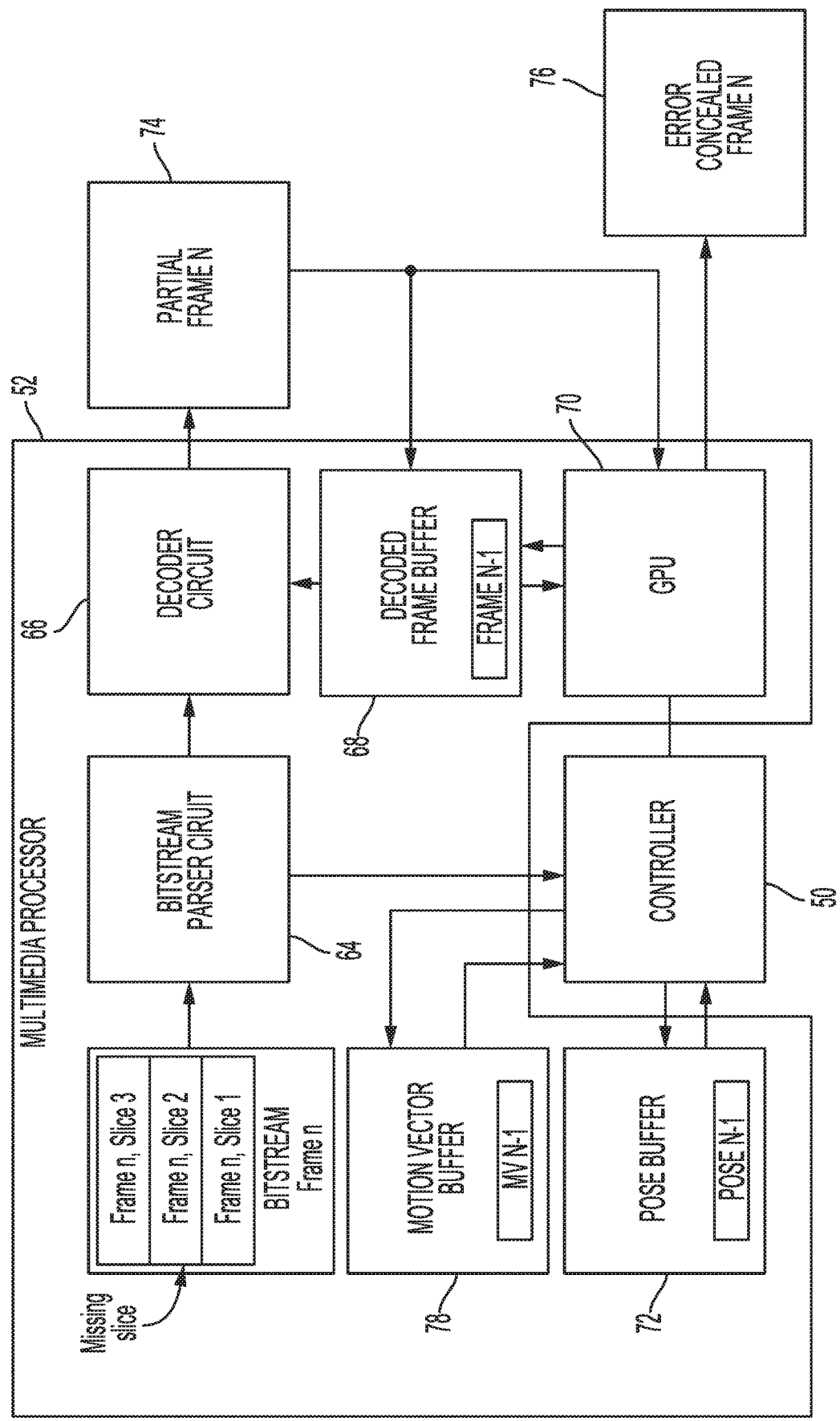
FIG. 4 is a block diagram illustrating another example of the multimedia processor of FIG. 2 in greater detail.

As an example, multimedia processor 52 may include a bitstream parser circuit, illustrated in FIGS. 3 and 4, which receives the bitstream via path 62 generated by host device 10. The bitstream parser circuit may determine portions of the current frame for which there is no image content information. For example, the bitstream parser circuit may determine for which slices of the current frame there was packet loss. Based on the determination of which slices had packet loss, controller 50 may generate a mask for the current frame. In this mask, a logic zero for a portion (e.g., slice) indicates that image content information was received, and a logic one for a portion (e.g., slice) indicates that image content information was not received. In this way, the mask indicates holes/missing macroblocks in the frame.

In addition, controller 50 may be configured to perform a homography based on the difference in the poses of the current frame and a previous frame. The previous frame may be the frame that is displayed or is to be displayed immediately before the current frame. In some examples, the previous frame may be the frame that is decoded immediately before the current frame. However, the techniques are not so limited, and the previous frame may be any previously decoded frame, and not necessarily the immediately preceding frame in display or decoding order.

Homography is the process by which controller 50 determines where a point in the previous frame would be located in the current frame given the pose associated with the previous frame and the pose associated with the current frame. As one example, homography is a transformation where coordinates in a point in the previous frame are multiplied by a 3×3 matrix to generate the coordinates of that point in the current frame. Stated another way, homography transforms image content of an image from its perspective to the perspective of another image.

In examples described in this disclosure, the perspective associated with the previous frame is the pose information associated with the previous frame, and the perspective associated with the current frame is the pose information associated with the current frame. Controller 50 may determine the 3×3 transformation matrix (also called projection matrix) based on the pitch, roll, and yaw (e.g., pose information) of the previous frame, and the pitch, roll, and yaw (e.g., pose information) of the current frame. The pose information of the previous frame may be stored in a pose buffer, and the pose information of the current frame may be parsed from the received bitstream. Although controller 50 is described as determining the homography, the techniques are not so limited, and multimedia processor 52 may be configured to perform the homography.

The following is one example manner in which controller 50 may perform the homography. Assume that quaternion q1 represents the orientation of wearable display device 16 in the previous frame. For example, q1 could be in the OpenGL format glm::quat. Similarly, q2 represents the quaternion of orientation of wearable display device 16 for the current frame. Controller 50 may first determine the difference between the orientations as a third quaternion q3=glm::inverse(q2)*q1. Controller 50 may compute the homography corresponding to this difference using the method glm::mat4_cast(q3) in accordance with the OpenGL API.

Multimedia processor 52 may include a decoder circuit that is configured to use the image content information in the bitstream to reconstruct the current frame. For instance, the decoder circuit may be configured in accordance with the example video coding techniques described above. The result of the decoding process is a current frame. However, in this current frame, there may be missing portions because image content information for these portions of the current frame was not available or had too many errors.

As described above, in performing the homography, controller 50 may determine the coordinates of where points in the previous frame would be located in the current frame. Based on the determined coordinates and the color values of the pixels in the previous frame, controller 50 may cause a graphics processing unit (GPU) of multimedia processor 52 to warp the image content of the previous frame. For example, controller 50 may output graphics commands that causes the GPU to perform the warping.

One example way in which to perform the warping is via texture mapping. In texture mapping, the GPU maps image content from a texture (e.g., the previous frame) to a frame mesh. In this example, the GPU receives the coordinates of vertices in the previous frame and coordinates for where the vertices are to be mapped for the warping based on the homography determined by controller 50. In turn, the GPU maps the image content of the vertices to points on the frame mesh determined from the homography. The result is the warped image content.

For example, to perform the homography, controller 50 determines a projection matrix based on the pose information of the previous frame and the pose information of the current frame. As described above, controller 50 may utilize OpenGL commands such as glm for computing the homography between the previous frame and the current frame. The pose information of the current information may be part of the quaternion definition of the current frame, where the quaternion is a manner in which to define a three-dimensional space. The resulting homography may be a 3×3 projection matrix, also called rotation matrix, with which the GPU performs the warping.

The GPU executes a vertex shader that transforms the vertex coordinates of primitives in the previous frame to projected vertex coordinates based on the projection matrix (e.g., rotation matrix). A texture circuit of the GPU receives the pixel values of pixels on the vertices of primitives in the previous frame, the vertex coordinates of the primitives in the previous frame, and the projected vertex coordinates. The texture circuit then maps the image content from the previous frame based on the pixel values, the vertex coordinates of the primitives in the previous frame, and the projected vertex coordinates onto a frame mesh. The GPU executes fragment shaders to generate the color values for the pixels within the frame mesh to generate the warped frame.

This example technique to generate the warped frame is referred to as applying asynchronous time warp (ATW). In some examples, controller 50 and the GPU may apply ATW with depth. For instance, in ATW, controller 50 may determine that the coordinate for each vertex in the previous frame is (x, y, 1), where each vertex is assigned a depth of 1. In ATW with depth, controller 50 may receive depth information of the previous frame, where the depth information indicates the depth of vertices in the previous frame. Controller 50 may then assign each vertex the coordinates of (x, y, z), where the z value is based on the depth indicated by the depth map. The other operations of the texture circuit may be the same.

In some examples, controller 50 may additionally or alternatively apply asynchronous space warping (ASW). In ATW or ATW with depth, controller 50 accounts for the difference in the image content from previous frame to current frame based on the difference in amount of time that elapsed. In ASW, controller 50 may account for movement of image content within the frames. For instance, controller 50 may use motion vectors of blocks in the previous frame to generate the projection matrix. Similar to ATW with depth, in some examples, controller 50 may use depth information with ASW. In ATW, ATW with depth, ASW, and ASW with depth, the manner in which controller 50 generates the projection matrix may be different. However, once the projection matrix is generated, the texture mapping techniques to generate the warped frame may be generally the same.

There may be other ways in which to perform the warping of the image content of the previous frame than the example techniques described above. For instance, the above warping techniques include asynchronous time warp (ATW), ATW with depth, asynchronous space warp (ASW), ASW with depth, and other techniques.

In some examples, the GPU may perform warping on the entirety of the previous frame to generate a warped frame. In some examples, the GPU may perform warping only on portions of the previous frame that are located in the same position as the portions of the current frame for which image content information was lost (e.g., not received or was corrupted). For instance, as described above, controller 50 may generate a mask that indicates for which portions image content information was received and for which portions image content information was not received. Based on the mask, the GPU may warp the portion of the previous frame. As described further below, in some examples, the mask may be a running mask indicating portions of image content information not received in the current frame, as well as portions of image content information not received in one or more previous frames.

The GPU may blend the warped image content with the image content in the current frame. One example way to blend is for the GPU to replace the image content in the portions of the current frame identified as not receiving image content information (e.g., from the mask) with image content from the warped image content.

Another example way to blend is for the GPU to perform an OR operation using the mask generated by controller 50. In one example, in the mask, a logic zero for a portion (e.g., slice) indicates that image content information was received, and a logic one for a portion (e.g., slice) indicates that image content information was not received.

FIG. 3 is a block diagram illustrating an example of multimedia processor 52 of FIG. 2 in greater detail. As illustrated, multimedia processor 52 includes bitstream parser circuit 64, decoder circuit 66, decoded frame buffer (DFB) 68, GPU 70, and pose buffer 72. Pose buffer 72 and/or DFB 68 may be external to multimedia processor 52 in some examples.

Multimedia processor 52 may include more or less circuitry than illustrated in FIG. 3. The illustrated circuits within multimedia processor 52 may be formed together as a system-on-chip (SoC) or may be individual, separate integrated circuits. In some examples, controller 50 may be formed in the same integrated circuit as multimedia processor 52. Multimedia processor 52 may include fixed-function circuitry, programmable circuitry, or a combination of fixed-function and programmable circuitry. Multimedia processor 52 may include one or more processors, such as one or more microprocessors, application specific integrated circuits (ASICs), field programmable gate arrays (FPGAs), digital signal processors (DSPs), or other equivalent integrated circuits or discrete logic circuits.

The example techniques described in this disclosure are described with respect to controller 50 and/or multimedia processor 52. Controller 50 and/or multimedia processor 52 are examples of processing circuitry that is configured to perform the example techniques described in this disclosure.

Pose buffer 72 may be part of local memory (e.g., cache) of multimedia processor 52. In some examples, pose buffer 72 may be part of the system memory of wearable display device 16, such as in examples where pose buffer 72 is external to multimedia processor 52. Pose buffer 72 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), flash memory, a magnetic data media or an optical storage media.

As illustrated, bitstream parser circuit 64 receives a bitstream that includes image content information for frame n. In this example, frame n includes three slices 1-3. Also, assume that the image content information for slice 2 is dropped or corrupted.

The bitstream may be packetized and includes image content information for each slice, where the image content information indicates the manner in which the slices are to be reconstructed. The packetized information may include header information, which may be some auxiliary data, that indicates to which slice the image content information belongs. Bitstream parser circuit 64 may depacketize the information, read the headers, and form an output bitstream of image content information that decoder circuit 66 can process. As part of the reading of the headers or depacketizing, bitstream parser circuit 64 may output information indicating portions of frame n for which multimedia processor 52 did not receive image content information to controller 50.

For instance, in FIG. 3, bitstream parser circuit 64 may determine, based on the header information, that image content information for slice 1 is included in the bitstream. Then, bitstream parser circuit 64 may determine, based on the header information, that image content information for slice 3 is included in the bitstream. Because there was no header information for slice 2, bitstream parser circuit 64 may determine that information for slice 2 is not in the bitstream because it did not parse any header information indicating that image content information is for slice 2.

As another example, bitstream parser circuit 64 may output information to controller 50 indicating the slice for which bitstream parser circuit 64 received image content information. Controller 50 may then track for which portions of frame n multimedia processor 52 received image content information. There may be other ways in which to determine for which portions of frame n multimedia processor 52 received image content information.

Based on information received from bitstream parser circuit 64, controller 50 may generate a mask for the current frame based on the determined portions of the current frame for which image content information was lost (e.g., portions of current frame for which image content information was not received, not included in the bitstream, or corrupted). The mask indicates portions (e.g., slices) of the current frame for which image content information was received (e.g., logic zeros in the mask are associated with portions for which image content information was received), and portions of the current frame for which image content information was lost (e.g., logic ones in the mask are associated with portions for which image content information was not received).

Decoder circuit 66 may receive the image content information from bitstream parser circuit 64, and reconstruct the current frame (e.g., frame n). In some examples, the image content information includes information such as motion vectors for blocks within portions of frame n and reference pictures, where a motion vector refers to a predictive block in a reference picture. A reference picture is a previously decoded picture that is stored in DFB 68. For example, as illustrated DFB 68 includes frame n-1, which is a previously decoded frame.

Frame n-1 need not be the frame that is displayed immediately before frame n, but may be a frame that is displayed immediately before frame n. Frame n-1 need not be the frame that is decoded immediately before frame n, but may be a frame that is decoded immediately before frame n. Although this disclosure refers to the previous frame as frame n-1, the previous frame need not be the immediately preceding frame in decoding or display order, and may be any frame stored in DFB 68.

The output of decoder circuit 66 is partial frame n 74. Frame n 74 may be a partial frame because frame n 74 includes portions that are erroneous. For instance, because there was no image content information for slice 2, image content for slice 2 may not be present in frame n 74. In some examples, decoder circuit 66 may perform some level of error concealment, such as by copying image content from frame n-1 that corresponds to the portion in frame n for which image content information was not received to generate partial frame n 74. However, such error concealment techniques may not be sufficient because they fail to account for pose information.

In the techniques described in this disclosure, bitstream parser circuit 64 may also determine the pose information of frame n, which may be part of the header information of frame n. The pose information may be the pitch, roll, yaw of perspective from which frame n was generated by host device 10. Controller 50 may receive the pose information for frame n from bitstream parser circuit 64, and store the pose information in pose buffer 72. Alternatively or additionally, bitstream parser circuit 64 may store the pose information in pose buffer 72, and controller 50 retrieves the pose information from pose buffer 72.

Pose buffer 72 stores pose information of frames that are processed by multimedia processor 52. For example, for each frame, pose buffer 72 may store the pose information associated with that frame. As another example, in some examples, bitstream parser circuit 64 may receive timestamps for frames, and pose buffer 72 may store the pose information associated with a timestamp. In such examples, the timestamp points to an entry in pose buffer 72. There may be other ways in which pose buffer 72 stores pose information that is associated with the frames.

Controller 50 receives the pose information for frame n-1 (e.g., pose n-1 of FIG. 3) and pose information for frame n, and generates a homography based on the pose information. In the homography, controller 50 determines a transformation of where image content from frame n-1 would appear in the field-of-view from which frame n was generated. For example, controller 50 may determine a difference in the pose information between frame n and frame n-1 (e.g., difference in pose n and pose n-1), and generates a projection matrix that GPU 70 uses to re-project frame n-1 to a view appropriate for time n, as described above with respect to the homography.

GPU 70 executes a vertex shader that transforms vertex coordinates of primitives in frame n-1 based on the projection matrix (e.g., multiplies coordinates with the projection matrix) to generate projected vertex coordinates. GPU 70 includes a texture circuit that maps pixels from frame n-1 to a frame mesh based on the coordinates in frame n-1 and the projected coordinates. GPU 70 may also execute fragment shaders (also called pixel shaders) to shade in (e.g., fill in) the image content in the frame mesh. The mapping of pixels to the mesh, and filling in the image content with fragment shaders is referred to as texture rendering.

As an illustrative example, assume that a primitive in frame n-1 has the following vertex coordinates: (x1, y1, 1), (x2, y2, 1), and (x3, y3, 1). After the vertex shader multiplies the coordinates with the projection matrix (also called rotation matrix), the projected coordinates may be (x1', y1', 1), (x2', y2', 1), and (x3', y3', 1). In this example, the texture circuit may stretch, shrink, rotate, or otherwise modify the image content with the primitive defined by the vertices (x1, y1, 1), (x2, y2, 1), and (x3, y3, 1) so that the image content fits within the primitive on the frame mesh defined by the vertices (x1', y1', 1), (x2', y2', 1), and (x3', y3', 1). In the stretching, shrinking, rotating, or modifying, GPU 70 may execute one or more instantiations of fragment shaders to determine the color values of pixels within the primitive defined by the vertices (x1', y1', 1), (x2', y2', 1), and (x3', y3', 1).

In some examples, GPU 70 may perform such operations for each primitive in frame n-1 to generate a warped frame. In some examples, GPU 70 may perform such operations only for primitives in frame n-1 that correspond to portions of frame n for which image content information was not received (e.g., as indicated by the generated mask). In this way, GPU 70 may generate warped image content based on the pose information of a current frame (e.g., frame n) and a previous frame (e.g., frame n-1).

The example warping performed by GPU 70 described above is ATW. In some examples, multimedia processor 52 may include a depth buffer that stores depth information (e.g., a depth map) for pixels or portions in each of the frames. The depth information indicates how far back or in front the image content is to appear to a viewer. Controller 50 may use the depth information along with the difference in the pose information to generate the projection matrix that GPU 70 uses for generating the projected vertex coordinates. For ATW with depth, the texture rendering operations may be similar to those described above for ATW.

In some examples, such as if frame n and frame n-1 are separated by relatively large amount of time, it may be possible that there are portions in the warped image content for which the texture circuit did not map any image content. This may be because there was no vertex in frame n-1 that when multiplied by the projection matrix resulted in there being a vertex in a particular portion of the warped image content. Because there is no vertex in this portion of the warped image content, GPU 70 may not render any image content to that portion resulting in blank space in the warped image content.

To address this, in some examples, multimedia processor 52 may receive from host device 10 image content for a larger field of view (FOV) than the FOV of frame n-1. For example, assume that frame n-1 encompasses a rectangular area of image content. Host device 10 may transmit image content information for a larger rectangular area than the rectangular area encompassed by frame n-1. This additional image content may not be visible when frame n-1 is displayed. However, this additional image content may be used when the texture circuit performs the texture rendering. For instance, the texture circuit may warp not only the image content in frame n-1 but the image content in larger FOV to generate the warped image content.

Transmitting of the additional FOV may be based on the latency between the host device 10 and wearable display device 16. For example, if there is high latency, then host device 10 may increase the FOV of frame to ensure there is image content available from the previous frame for the warping as the amount of warping needed may be greater since the viewer may change pose by a relatively large amount. If there is low latency, then host device 10 may decrease or leave unchanged the FOV of frames as the amount of warping needed may not be great since the viewer may not change pose by a large amount.

GPU 70 may blend the image content from partial frame n 74 with the warped image content to generate error concealed frame n 76. As one example, for portions of frame n for which multimedia processor 52 did not receive any image content information, GPU 70 may copy image content information from the warped image content and replace any image content that may be in the portion with the copied image content.

As another example, controller 50 or GPU 70 may smooth the generated mask. For example, the mask may include zeros and ones, where zero is associated with portions of frame n for which image content information was received, and one is associated with portions of frame n for which image content information was not received. In some examples, controller 50 and/or GPU 70 may perform a weighted average such that rather than having a jump from a zero in the mask to a one in the mask or vice-versa from one to zero, the values are slowly ramped from a zero to a one and vice-versa from one to zero. For example, along the border of where the mask values change from zero to one, the values may be smoothed so that the transition from zero to one is gradual (e.g., the values are changed to 0.1, 0.2, 0.3, and so forth to 1).

These values may then represent the blend factors. For example, GPU 70 may read the smoothed mask value and perform blending based on the mask value. As an example, if a mask value is 0.4, then GPU 70 may use 40% of the color value of the pixel in partial frame n 74 and 60% of the color value of the corresponding pixel in the warped image content to generate a blended color value.

FIG. 4 is a block diagram illustrating another example of the multimedia processor of FIG. 2 in greater detail. FIG. 4 is substantially similar to FIG. 3, and circuits having same reference numerals operate in the same manner or substantially the same manner.

FIG. 3 illustrated the example operation of multimedia processor 52 with respect to ATW or ATW with depth in generating the warped image content. FIG. 4 illustrates the example operation of multimedia processor 52 with respect to ASW or ASW with depth in generating the warped image content.

As illustrated, multimedia processor 52 includes motion vector buffer 78, which may be similar to pose buffer 72 and DFB 68. However, motion vector buffer 78 stores motion vector information for frames that multimedia processor 52 processes.

In FIG. 4, bitstream parser circuit 64 unpacks from the bitstream the motion vectors, and forwards them to controller 50. The motion vectors may be part of the auxiliary data that bitstream parser circuit 64 transmits to controller 50. In some cases, the motion vectors should indicate correspondences between two rendered frames, and could be generated by high end GPU on host device 10. In some examples, rather than bitstream parser circuit 64, decoder circuit 66 may output the motion vectors.

Controller 50 may be configured to warp vectors based on the pose information of frame n and frame n-1, and available motion vectors of frame n. For instance, motion vectors of frame n point to reference blocks in frame n-1. Controller 50 may determine the extrapolated 3D position of blocks in frame n based on motion vectors sent in frame n, pose n-1, and pose n-2. Use of motion vectors is described in more detail with respect to FIG. 6.

Figure 5:
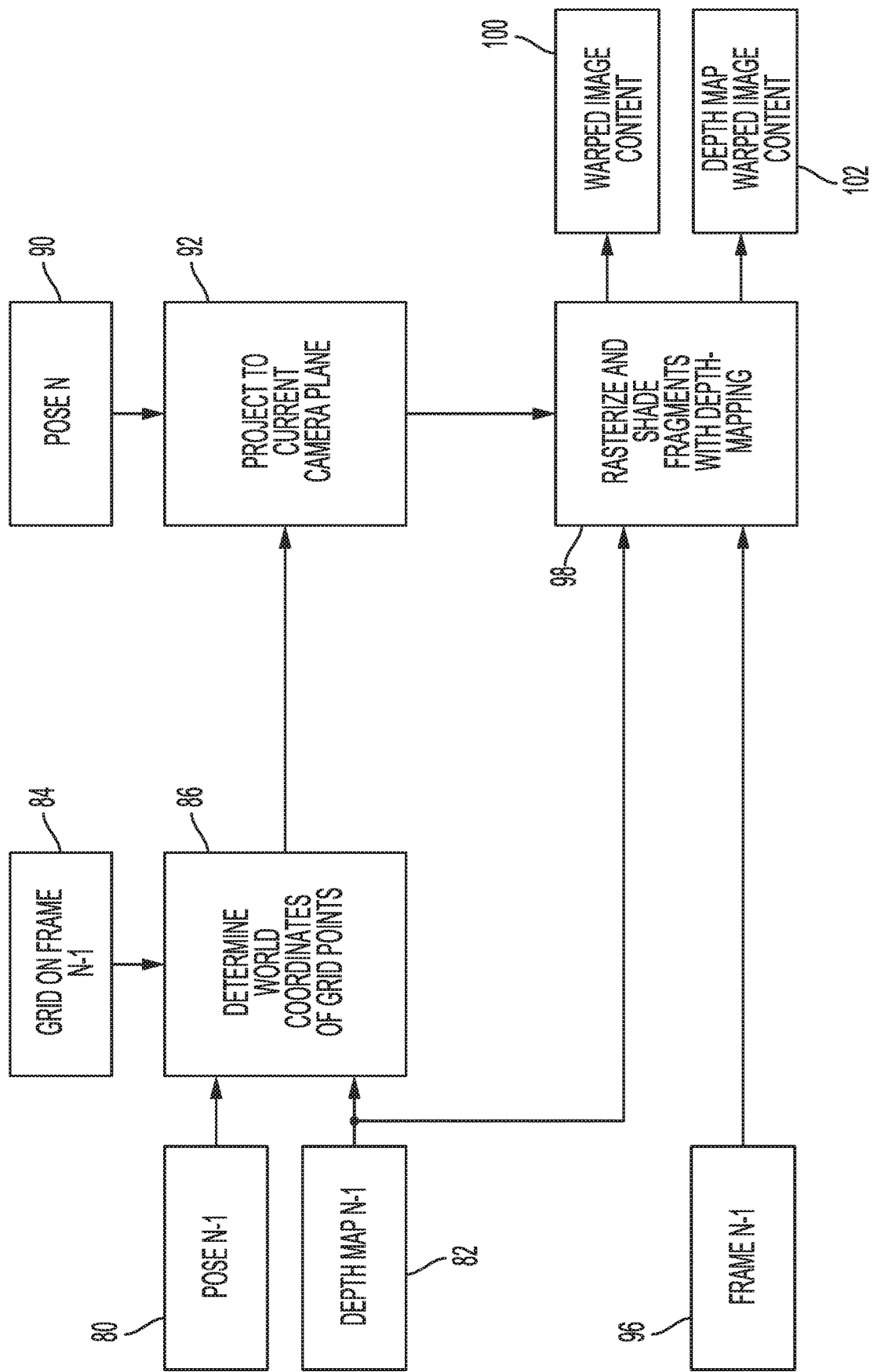
FIG. 5 is a process diagram illustrating an example of time warping with depth.

FIG. 5 is a process diagram illustrating an example of time warping with depth. For instance, FIG. 5 illustrates ATW and ATW with depth similar to the above description. Controller 50 receives eye pose information from sensing circuit 20 for frame n-1 (80), and depth map for frame n-1 from host device 10 (82). In addition, controller 50 may generate a grid on frame n-1 (84). The grid on frame n-1 may be frame n-1 divided into rectangles.

Controller 50 assigns each point on the grid an (x, y, z) coordinate (86), and the result is a grid with (x, y, z) coordinates. In some examples, such as ATW with depth, controller 50 may assign z coordinates to points on the grid based on the depth map for frame n-1. The x and y coordinates may be the x and y coordinates starting from the top-left corner of frame n-1 having x-coordinate of 0 and y-coordinate of 0. In some examples, controller 50 and/or multimedia processor 52 may generate x, y, z world coordinates of frame n-1 using depth map and focal length as described in more detail below.

Controller 50 receives the pose information for frame n (90), and based on (x, y, z) coordinates from the grid of frame n-1 generates a projection matrix for where the pixels in the grid will be visible in the perspective of frame n (92). The result of this operation may be a grid on current frame (e.g., frame n). For instance, in some examples, controller 50 may perform the multiplication between the projection matrix and the coordinates on the grid. In other examples, GPU 70 may perform the multiplication.

GPU 70 may then rasterize and shade fragments with appropriate depth-mapping (98). For example, GPU 70 may receive frame n-1 (96), and may texture map frame n-1 to the grid on frame n, and perform rasterizing and shading (98) to generate the warped image content (100) and the depth map for the warped image content (102). The depth map of the warped image content is the z-coordinate determined as part of the warping. GPU 70 may then use the warped image content for error concealment in accordance with the examples described above. The depth map of the warped image content may be then used to substitute the depth information of the current frame for which image content information was not received.

The following provides an example of how depth is used for warp, such as the manner in which to find world coordinates of grid points. Assume that there is a plurality of objects viewable from a vantage point $p_n$. However, not the entirety of the objects may be viewable (e.g., the back of the object is occluded by the front of the object), or one object may occlude another object. Accordingly, on an image plane, with an image width W, a subset of the objects is viewable.

The image plane is a focal length away from the hypothetical camera capturing the image content. For example, an actual camera is not needed for various graphics application; however, a focal length may still be a valid measure. A focal length may be indicative of where a hypothetical camera capturing the image content is located even though there is no actual camera. The hypothetical camera may be considered as the vantage point of the viewer. The focal length is set by host device 10 to set how far or close image content should appear. In addition, controller 50 and/or host device 10 may generate a depth map that indicates the depth of each of the objects.

Host device 10 may transmit the focal length and/or the depth map. Based on the focal length and depth map, controller 50 may determine the x and y coordinates for the objects to be rendered relative to the camera. For example, let $f_n$ be a rendered image at time n. The pixels in this image are obtained by projecting surfaces of objects visible from the vantage point (e.g., camera position) $p_n$ on the image plane. Each pixel in the image corresponds to a point on a visible surface, and has an (x, y) coordinate on the image plane, which is two-dimensional.

For a depth map, $d_n$ for $f_n$, as received from host device 10, then for a pixel (x, y) on the image plane, there is a depth value z', which is received from the depth map. The depth map stores a z' value for (x, y) pixels on the image plane.

The corresponding 3D coordinate relative to camera is x'=x*z'/F, y'=y*z'/F, where the focal length F equals W/(2*tan(FOV)/2)), where W is the width of the image in pixels, and field of view (FOV) is the horizontal FOV and is an angular measure of how much image content in a 360-degree space is captured.

For a camera pose $p_n=(x_n, y_n, z_n, q_n)$, the world coordinates of the pixel is $$\begin{bmatrix} x'' \\ y'' \\ z'' \end{bmatrix} = \begin{bmatrix} xn \\ yn \\ zn \end{bmatrix} + R(qn) * \begin{bmatrix} x' \\ y' \\ z' \end{bmatrix},$$

R(qn) is a rotation matrix that aligns the camera coordinate system with the world coordinate system. Once the world coordinates of pixels are determined, GPU 70 may project them (e.g., texture map) to a different image plane corresponding to a new camera pose $p_{n+1}$ to determine where they should lie in that image plane.

For example, controller 50 or multimedia processor 52 may determine the world coordinates for the pixels in the frame n-1 (e.g., previous frame) using the above example techniques based on the depth map of frame n-1. Once controller 50 and/or multimedia processor 52 determine the world coordinates for pixel in frame n-1, GPU 70 may perform texture mapping using the world coordinates for pixel in frame n-1 and the current pose of wearable display device 16 to generate world coordinates for pixel in the warped frame. In this manner, multimedia processor 52 may generate the warped frame using depth map.

Figure 6:
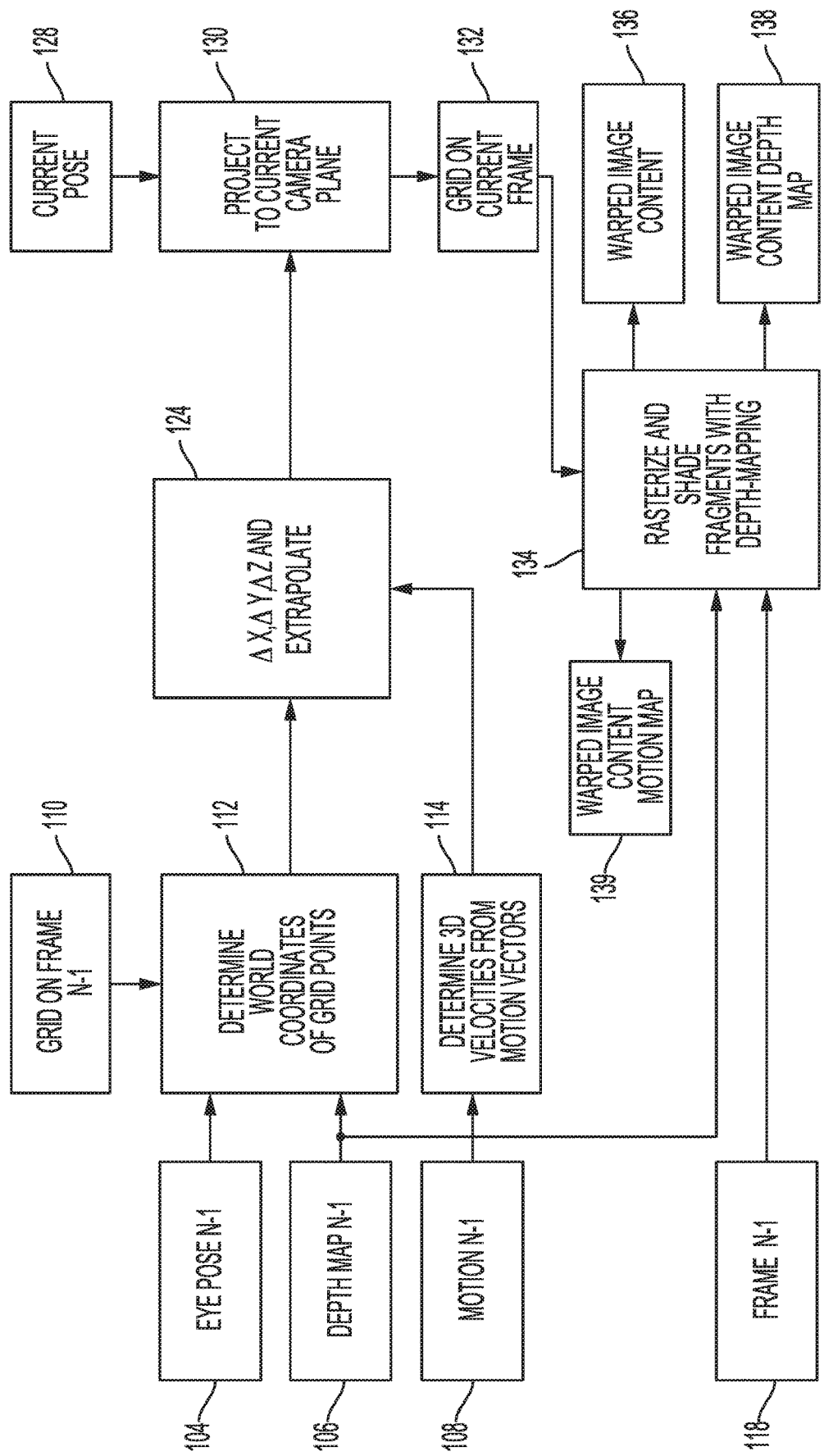
FIG. 6 is a process diagram illustrating an example of space warping with depth.

FIG. 6 is a process diagram illustrating an example of space warping with depth. The process illustrated in FIG. 6 may be similar to that illustrated in FIG. 5. However, motion vectors from frames may also be used to warp image content of frame n-1.

Space warping accounts the movement of the objects in addition to changes in the pose of wearable display device 16. For instance, in ATW and ATW with depth, the warping is performed based on changes in the position of wearable display device 16 but the movement of objects is not accounted for. Space warping accounts for velocities at which objects may be moving, which is based on motion vectors. For example, if a block in the current frame has a large motion vector (e.g., relatively large x and y values for the motion vector), then the movement of the object may be relatively fast. If a block in the current frame has a small motion vector (e.g., relatively small x and y values for the motion vector), then the movement of the object may be relatively slow.

In FIG. 6, similar to FIG. 5, controller 50 receives eye pose information from sensing circuit 20 for frame n-1 (104), and depth map for frame n-1 from host device 10 (106). In addition, controller 50 may generate a grid on frame n-1 (110). The grid on frame n-1 may be frame n-1 divided into rectangles. Controller 50 and/or multimedia processor 52 may determine world coordinates on grid points (112) using the techniques described above based on focal length and depth map.

For space warping, controller 50 may determine a motion map for frame n-1 (108). The motion map indicates the motion vectors for blocks in frame n-1. From the motion vectors, controller 50 and/or multimedia processor 52 may determine 3D velocities (114).

The 3D velocities $v_x$, $v_y$, $v_z$ may not be directly specified, but motion vectors for the frame n-1 are available, where motion vectors in frame n-1 point to blocks in earlier frames (e.g., frame n-2). As an example to determine the velocities, assume that pixel (x, y) in frame n-1 corresponds to (a, b) in frame n-2 based on motion vectors. Based on the depth maps and pose information for frame n-1 and frame n-2, controller 50 and/or multimedia processor 52 may determine the world coordinates using the above techniques as (x", y", z") for frame n-1 and (a", b", c") for frame n-2. The 3D velocity may be calculated as follows:

$$\begin{bmatrix} vx \\ vy \\ vz \end{bmatrix} = \left( \begin{bmatrix} x'' \\ y'' \\ z'' \end{bmatrix} - \begin{bmatrix} a'' \\ b'' \\ c'' \end{bmatrix} \right) / t,$$

where t is time difference between consecutive frames (e.g., frame n-1 to frame n-2).

With the velocities, controller 50 and/or multimedia processor 52 may extrapolate the x, y, z coordinates in the world space. The world coordinate of the pixel when the camera assumes pose $p_n$ is $$\begin{bmatrix} x'' + vx*t \\ y'' + vy*t \\ z'' + vz*t \end{bmatrix}.$$

Once the world coordinates of pixels are determined, GPU 70 may project them (e.g., texture map) to a different image plane corresponding to a camera pose $p_n$ to determine where they should lie in that image plane (i.e., image plane of frame n). The projection operation may involve the rotation matrix $R(q_n)$ that rotates the world coordinate system to the camera coordinate system (e.g., □X, □Y, □Z extrapolated (124))

Controller 50 receives the pose information for frame n (128), and based on (x, y, z) coordinates from the grid of frame n-1 generates a projection matrix for where the pixels in the grid will be visible in the perspective of frame n (e.g., camera plane) (130). The result of this operation may be a grid on current frame (e.g., frame n) (132). For instance, in some examples, controller 50 may perform the multiplication between the projection matrix and the coordinates on the grid. In other examples, GPU 70 may perform the multiplication.

GPU 70 may then rasterize and shade fragments with appropriate depth-mapping (134). For example, GPU 70 may receive frame n-1 (118), and may texture map frame n-1 to the grid on frame n, and perform rasterizing and shading to generate the warped image content (136), the depth map for the warped image content (138), and warped image content motion map (139). The depth map of the warped image content is the z-coordinate determined as part of the warping, and the warped image content motion map is the motion map for the warped image content. GPU 70 may then use the warped image content for error concealment in accordance with the examples described above. The depth map and motion map of the warped image content may be then used to substitute the depth information and motion map of the current frame for which image content information was not received.

Figure 7:
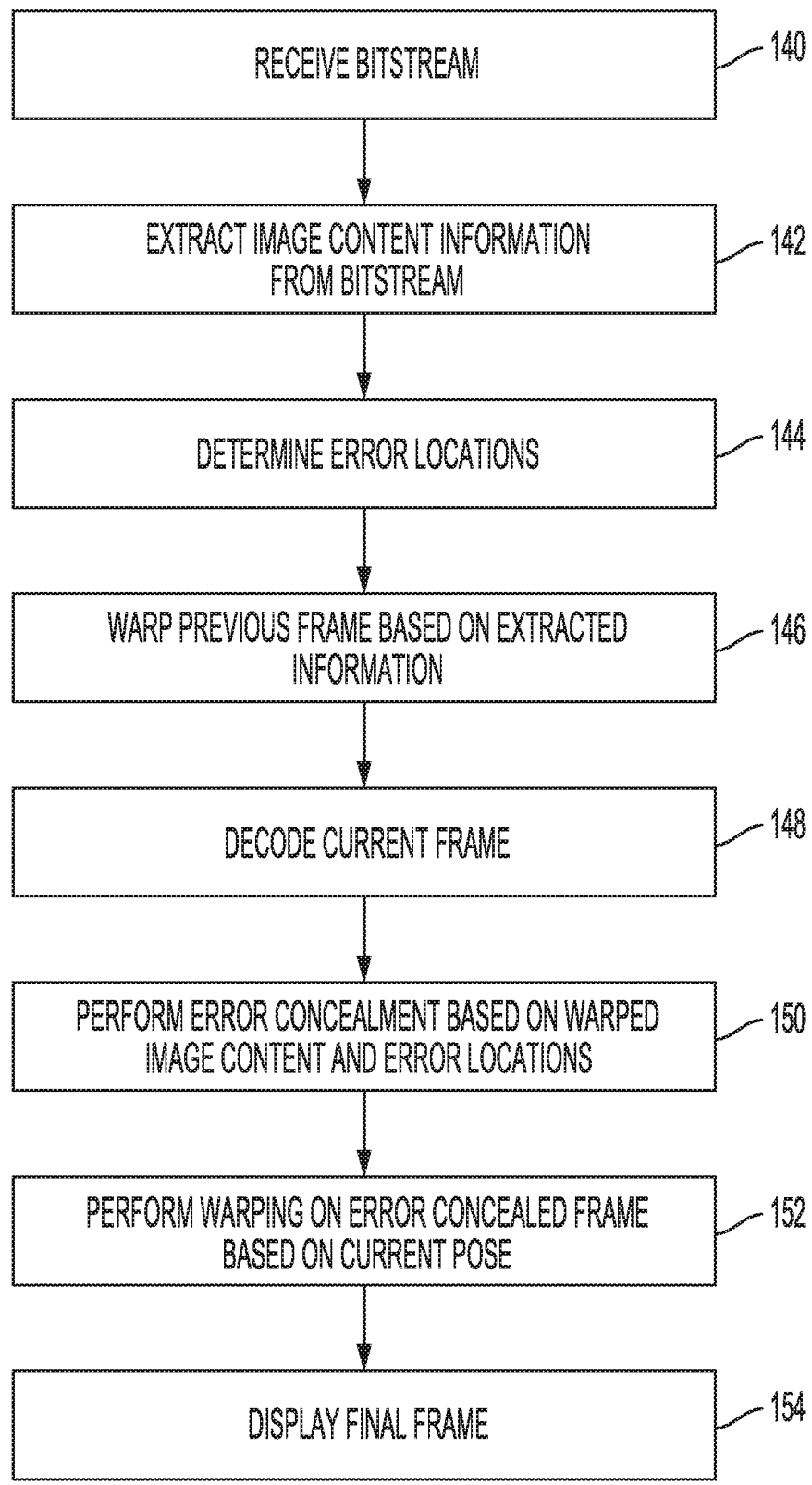
FIG. 7 is a flowchart illustrating a first example process of split rendering.

FIG. 7 is a flowchart illustrating a first example process of split rendering. For example, the process may execute on a device functioning as a WiFi Access Point. The device may be configured to function as a server in a split rendering system rendering frames for display by an HMD to a user.

In block 700, the server initiates a wireless connection with a client. For example, the client may be a device functioning as a WiFi Station. The client may be an HMD for displaying content to the user. The wireless connection may be a WiFi Reverse Direction Grant mode connection as discussed below. For example, the client HMD may be configured to detect user pose information as a 6 DoF pose.

In block 702, the server may transmit a trigger packet to the client over the wireless connection to query for a pose information. In a first example embodiment, the server may periodically generate and transmit the trigger packet. In a second example embodiment, the server may only generate and transmit the trigger packet when there is no rendered frame to transmit. In a third example embodiment, the server may only generate and transmit the trigger packet when pose information is needed from the client in order to render a frame. It will be appreciated the generation and transmission of the trigger packet may be initiated by an application layer module executing on the server. In some examples, the trigger packet can be any application layer packet, for example, packet of a rendered frame can also act as the trigger packet. Alternatively the 802.11 QoS null packet may be used.

In block 704, the server may receive a pose information from the client. It will be appreciated that the client may only send pose information when it receives a trigger packet or otherwise requested by the server. This may prevent network congestion and contention while preserving bandwidth for transmitting rendered frames to the client.

In block 706, the server may render one or more frames for display based on the received pose information. For example, the rendered frame may be a first view of a three-dimensional VR, AR or other XR content for display to the user.

In block 708, the server may transmit the rendered frames to the client over the wireless connection for display to the user. It will be appreciated that the client HMD may execute asynchronous time warping (ATW) on the received rendered frame based on a latest pose information before displaying to the user.

Figure 8:
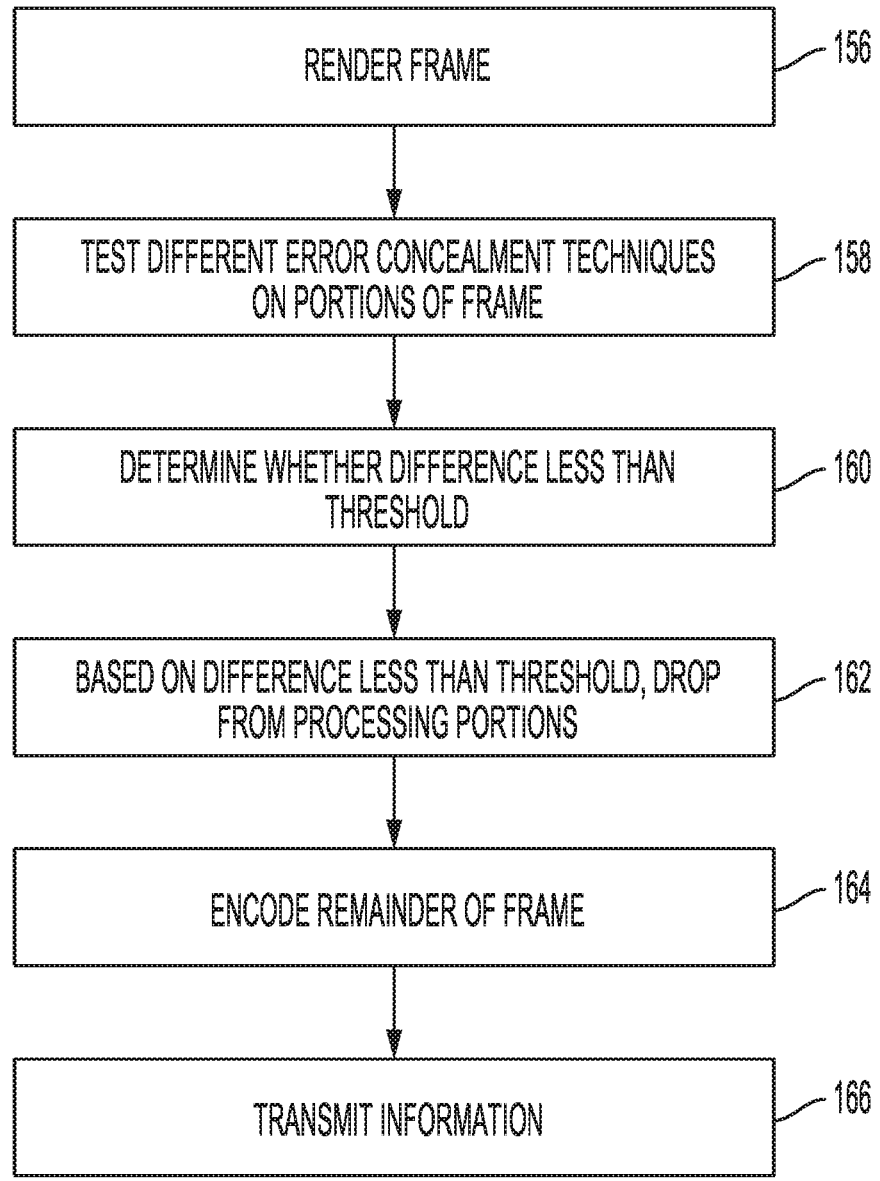
FIG. 8 is a flowchart illustrating a second example process of split rendering.

FIG. 8 is a flowchart illustrating a second example process of split rendering. For example, the process may execute on a client device functioning as a WiFi Station. The client may be an HMD for displaying content to the user and configured to detect user pose information as a 6 DoF pose.

In block 800, the client may set up a wireless connection with a server. The wireless connection may be a WiFi Reverse Direction Grant mode connection as discussed. For example, the server may be a device functioning as a WiFi Access Point and configured to function as a server in a split rendering system rendering frames for display by an HMD to a user.

In block 802, the client may determine whether a trigger packet has been received from the server. If not, the client may continue to wait. It will be appreciated that limiting the client from transmitting pose information to only when it receives a trigger packet or otherwise requested by the server helps prevent network congestion and contention while preserving bandwidth for transmitting rendered frames.

If a trigger packet has been received, the client may proceed to 804.

In block 804, the client may prepare and transmit a pose information. As discussed, the pose information may be 6 DoF pose information of the user's viewing orientation as determined by HMD sensors. For example, HMD sensors may include gyroscopes and accelerometers.

In block 806, the client may receive one or more frames rendered by the server based on the pose information transmitted in 804. For example, the rendered frame may be a first view of a three-dimensional VR, AR or other XR content for display to the user.

In block 808, the client may display the rendered frames to the user. It will be appreciated that the client HMD may further execute asynchronous time warping (ATW) on the received rendered frame based on a latest pose information before displaying to the user.

Figure 9:
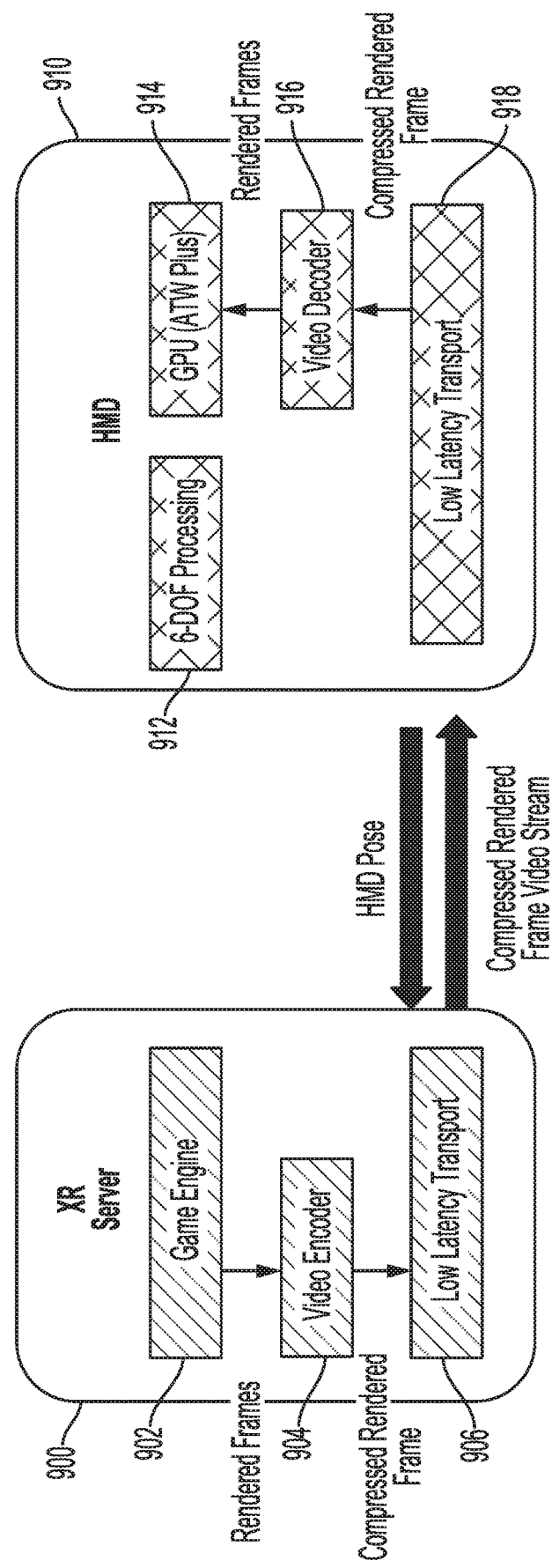
FIG. 9 illustrates an example split XR system architecture.

FIG. 9 illustrates an example split XR system architecture. Extended Reality (XR) may refer to real-and-virtual environments generated by computer graphics and wearables. The 'X' in XR may be a variable that can stand for any letter. XR is the umbrella category that covers all the various forms of computer-altered reality, including: Augmented Reality (AR), Mixed Reality (MR), and Virtual Reality (VR). An XR server 900 may be, for example, a VR server. The VR server may be in communication with a head-mounted display (HMD) 910 to provide a split render system architecture as discussed herein. The XR server 900 may include a game engine 902 providing rendered frames to a video encoder 904, which provides compressed rendered frames to a low latency transport module or layer 906.

The HMD 910 may also include a low latency transport module or layer 918, which communicates compressed rendered frames to a video decoder 916. The video decoder 916 may process the received frames and provide the rendered frames to a GPU 910. The GPU 910 may utilize features such as ATW and ASW as discussed herein to prepare final frames for display to a user at the HMD 910. The HMD 910 may include 6 DoF processing 912 including sensors and processing.

From the XR server 900, compressed rendered frame video stream is provided to the HMD 910. From the HMD 910, pose information, including, for example, head location, orientation, and 6-DoF information is provided to the XR server 900 for rendering frames. The downlink traffic from the XR server includes two video frames, for example, up to 300 KB per frame for each eye, every 16.7 ms if a 60 frames-per-second rate is maintained.

The uplink traffic includes 6 DoF pose information (~100 Bytes) every 1.25 ms. The uplink traffic is independent of the downlink traffic. It will be appreciated that the XR server 900 may use the latest available pose information to render a frame every 16.7 ms. Any pose information generated and transmitted more frequently does not improve XR server 900 rendering performance.

Certain challenges with split VR traffic over regular WiFi will be appreciated. For example, it is inefficient use of a wireless channel to transmit small uplink pose packets (pkts) every 1.25 ms. It will be appreciated that at most four poses (two for each eye with late latch—replacing a prior pose with a latest pose while the eye buffer is being rendered) can be used every 16.7 ms. Bidirectional traffic of the same application at the Access Point (AP) and Station (STA) compete for wireless bandwidth or wireless medium on its own and increases application latency and variance. Traffic from different STAs may compete for medium without coordination. There is no downlink/uplink delay guarantee for each STA, especially in multi-user scenarios. This makes it difficult to provide guaranteed real-time experiences.

Figure 10:
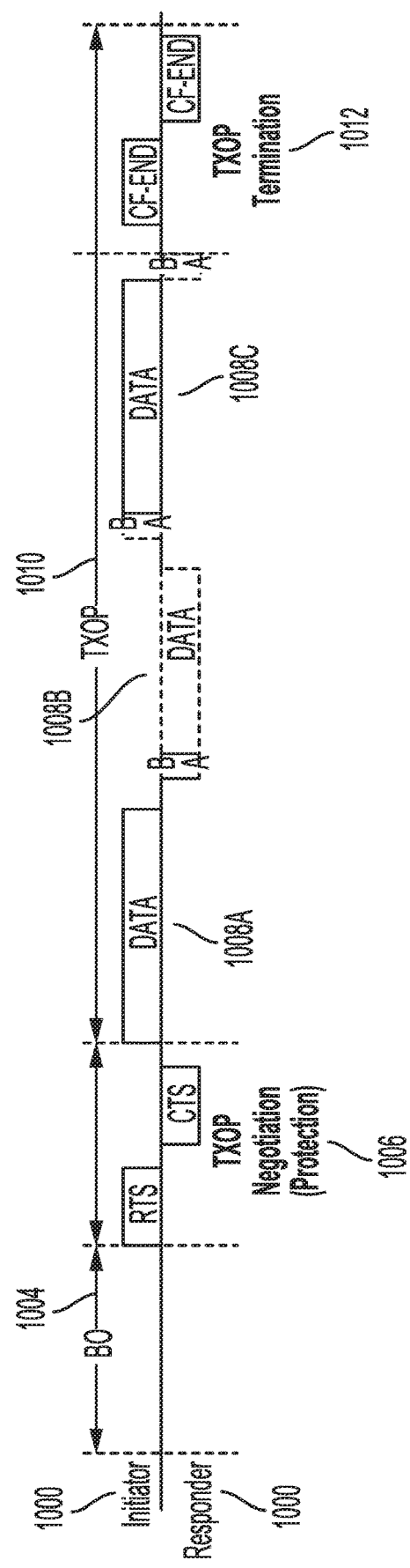
FIG. 10 illustrates an example timing diagram of a split XR system architecture.

FIG. 10 illustrates an example timing diagram of a split XR system architecture. In WiFi 802.11n, a Reverse Direction (RD) Protocol is provided. The RD protocol allows more efficient transfer of data between two 802.11 devices during a TXOP by eliminating the need for either device to initiate a new data transfer. In prior approaches, each unidirectional data transfer required an initiating station to capture (and possibly reserve time on) a contention-based wireless medium.

With RD, once the transmitting station has obtained a TXOP, it may essentially grant permission to the other station to send information back during its TXOP. This requires that two roles be defined: RD initiator and RD responder. The RD initiator sends its permission to the RD responder using a Reverse Direction Grant (RDG) in the RDG/More PPDU field of the HT Control field in the MAC frame. This bit is used by the RD initiator for granting permission (RDG) to the RD responder, and it is used by the RD responder to signal whether or not it is sending more frames immediately following the one just received (More PPDU).

In WiFi RDG mode, the AP or server is may be the transmission initiator 1000 and the STA or client HMD may be the transmission responder 1002. The responder 1002 may withhold uplink transmission until there is downlink data from initiator 1000. This may give control to the application layer logic of the XR server on the AP side, providing efficiencies discussed herein.

In BO 1004, the wireless connection may be established.

In RTS/CTS 1006, RTS/CTS (Request to Send/Clear to Send) WiFi messages are exchanged.

In TXOP 1010, it will be appreciated that the data 1008A and 1008C may be rendered frames transmitted from the server to the client. The client may only send pose information in data 1008B if it receives a trigger packet from the server. Otherwise, it remains in receive mode to avoid medium contention and congestion.

In 1012, RDG mode may be terminated once the wireless connection is no longer needed. For example, a HMD XR session may be ended by the user.

Figure 11:
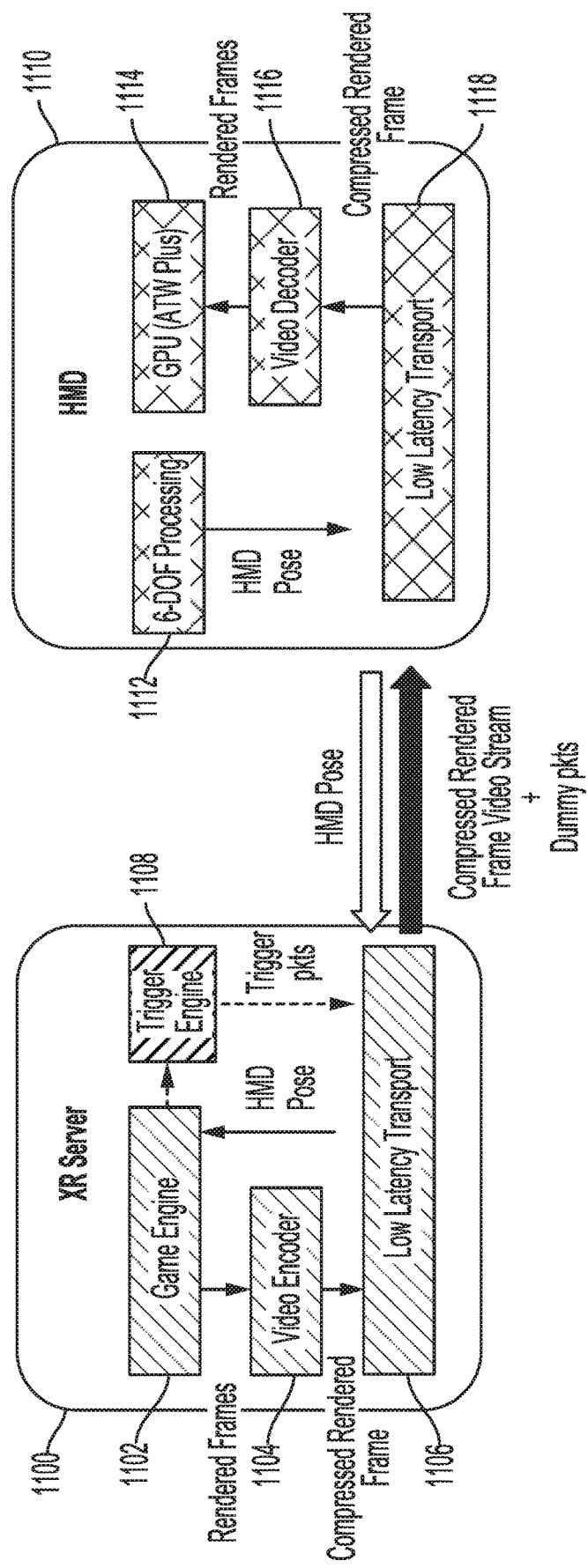
FIG. 11 illustrates an improved example split XR system architecture.

FIG. 11 illustrates an improved example split XR system architecture. This may be similar to the previously illustrated split XR system architecture of FIG. 9. A new trigger engine module 1108 is added to the XR server 900. The XR server 900 may thus use downlink (DL) traffic to poll for pose information at the HMD 910. This avoids contention and improves channel efficiency. The XR server 900 may send downlink trigger packets to retrieve the pose, for example, when there is no competing downlink video traffic. The application layer at the XR server 900 may be in control of the trigger packet generation.

Figure 12:
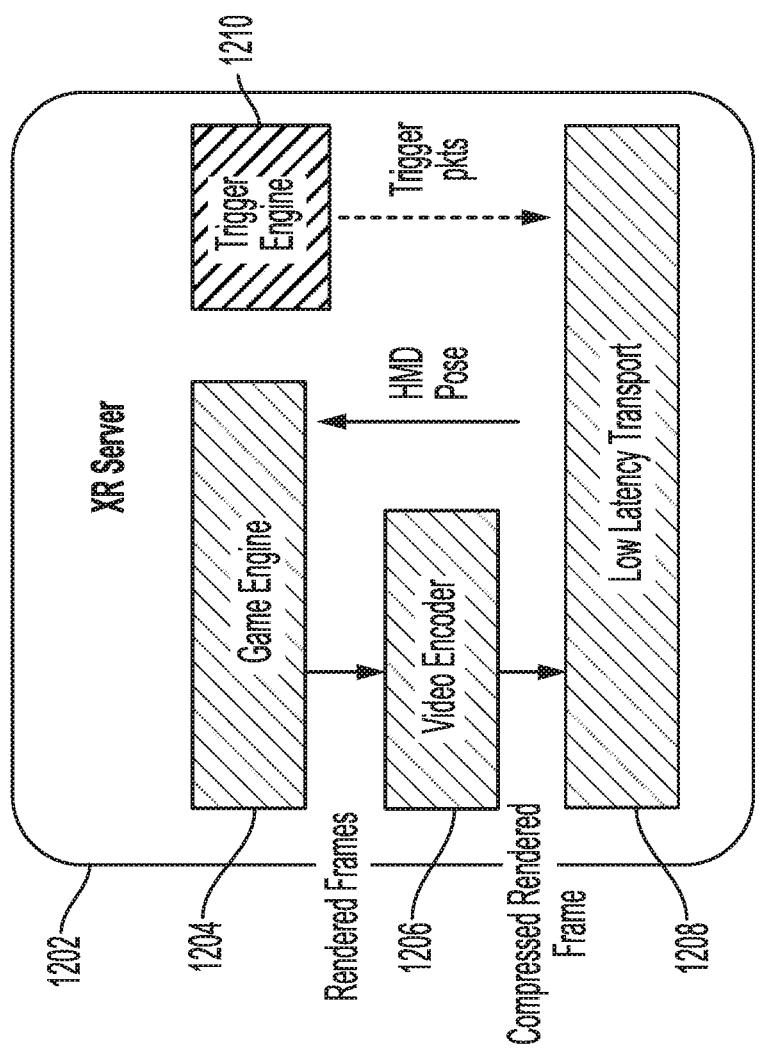
FIG. 12 illustrates a first example XR server system architecture.

FIG. 12 illustrates a first example XR server system architecture. The XR server 900 may be similar to the server previously illustrated in FIG. 11. In this example, the trigger packets are periodically generated. For example, the trigger engine 1108 may generate trigger packets periodically based on a maximum tolerable uplink pose information latency. This may be independent of the downlink traffic and the renderer timing. This approach has the benefit of simplicity, as trigger packets generation is decoupled from the rest of the XR pipeline. Unfortunately, there is a tradeoff between frequency of trigger packets and pose information latency. An alternative variant is to generate trigger packets when there is no downlink video traffic.

Figure 13:
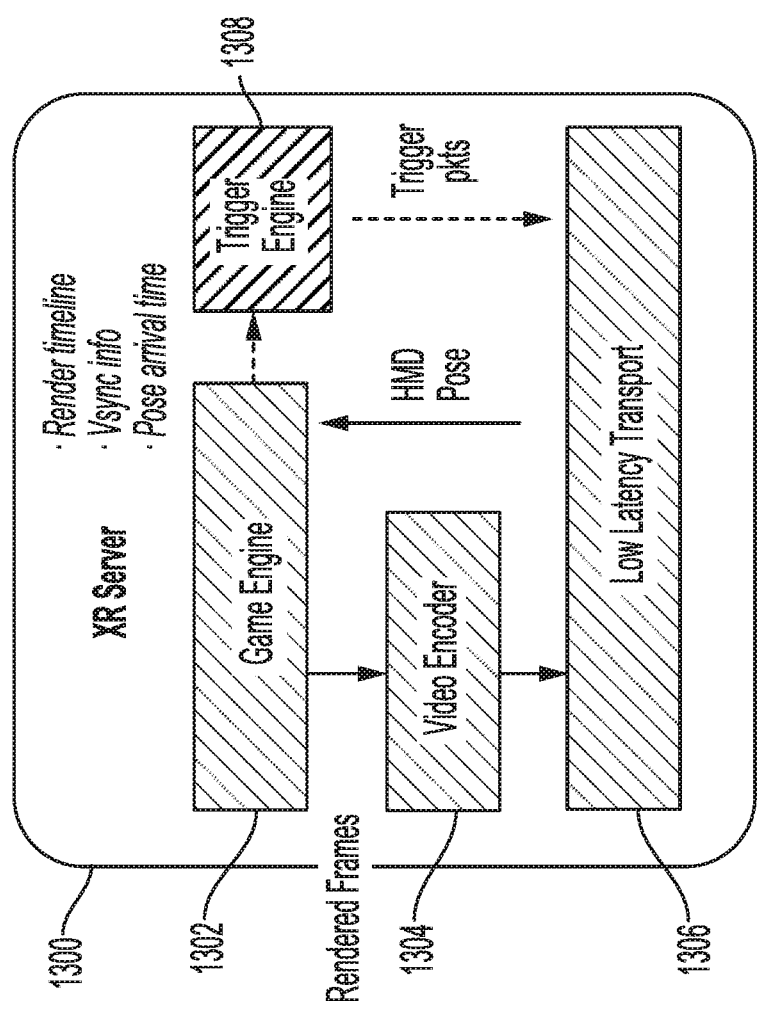
FIG. 13 illustrates a second example XR server system architecture.

FIG. 13 illustrates a second example XR server system architecture. In this example, the trigger engine 1108 may receive inputs from the game engine 902. For example, the following information may be considered and utilized: tender timeline for future frames, Vsync info from the previous UL pose packets, arrival time info for the previous UL pose packets, etc. This information is used by the trigger engine 1108 to compute an optimal time to send a trigger packet requesting pose information.

In another example, the trigger engine 1108 may generate a trigger packet on demand before a new video frame is rendered. In this example, the XR server 900 only polls for the uplink pose information before it is needed, and may further generate multiple trigger packets with lead time for reliability. An alternative variant is to generate trigger packets when there is no downlink video traffic.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. In some examples, computer-readable media may comprise non-transitory computer-readable media. Data storage media may be any available media that can be accessed by one or more computers or one or more processors to retrieve instructions, code and/or data structures for implementation of the techniques described in this disclosure.

By way of example, and not limitation, such computer-readable media can comprise non-transitory media such as RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the aspects have been described. These and other aspects are within the scope of the following claims.

What is claimed is:

1. A method of rendering frames for display to a user at a client device, the method comprising:
   initiating a wireless connection with a server, wherein the wireless connection is a WiFi Reverse Direction Grant mode connection and the server is an Access Point (AP) on a WiFi network;
   determining a pose information of the user;
   responsive to receiving a trigger packet from the server, transmitting the pose information to the server over the wireless connection, wherein the trigger packet indicates permission from the server to transmit during the server's transmit opportunity (TXOP), wherein the server provides permission to transmit during the server's TXOP periodically based on a pose information latency limit required for rendering a frame at the server;
   receiving the rendered frame from the server over the wireless connection, the rendered frame rendered for display based on the transmitted pose information; and
   displaying the received rendered frame to the user.

2. The method of claim 1, wherein the transmitted pose information is a 6 degrees of freedom (6 DoF) pose.

3. The method of claim 2, further comprising:
   executing asynchronous time warping (ATW) on the received rendered frame based on a latest pose information before displaying to the user.

4. The method of claim 1, further comprising:
   transmitting the pose information after a predetermined period of time if no trigger packet is received.

5. The method of claim 1, wherein the rendered frame is a first view of a three-dimensional Virtual Reality (VR) or Augmented Reality (AR) content for display to the user.

6. The method of claim 1, wherein the trigger packet is transmitted responsive to determining there is no rendered frame to transmit.

7. The method of claim 1, wherein the trigger packet is transmitted responsive to needing the pose information to render the frame.

8. The method of claim 7, wherein the trigger packet is initiated by an application layer module executing on the server.

9. An apparatus for rendering frames for display to a user, the apparatus comprising:
   a connection processor for initiating a wireless connection with a server and receive a trigger packet, wherein the wireless connection is a WiFi Reverse Direction Grant mode connection and the server is an Access Point (AP) on a WiFi network;
   a sensor for determining a pose information of the user;
   a processor configured to,
      responsive to receiving the trigger packet from the server, transmit the pose information to the server over the wireless connection, wherein the trigger packet indicates permission from the server to transmit during the server's transmit opportunity (TXOP), wherein the server provides permission to transmit during the server's TXOP periodically based on a pose information latency limit required for rendering a frame at the server,
      receive the rendered frame from the server over the wireless connection, the rendered frame rendered for display based on the transmitted pose information; and
   a display for displaying the received rendered frame to the user.

10. The apparatus of claim 9, wherein the transmitted pose information is a 6 degrees of freedom (6 DoF) pose.

11. The apparatus of claim 10, wherein the processor further configured to execute asynchronous time warping (ATW) on the received rendered frame based on a latest pose information before displaying to the user.

12. The apparatus of claim 9, the processor further configured to transmit the pose information after a predetermined period of time if no trigger packet is received.

13. The apparatus of claim 9, wherein the rendered frame is a first view of a three-dimensional Virtual Reality (VR) or Augmented Reality (AR) content for display to the user.

14. The apparatus of claim 9, wherein the trigger packet is transmitted responsive to determining there is no rendered frame to transmit.

15. The apparatus of claim 9, wherein the trigger packet is transmitted responsive to needing the pose information to render the frame.

16. The apparatus of claim 15, wherein the trigger packet is initiated by an application layer module executing on the server.

17. The apparatus of claim 9, wherein the sensor includes at least one of: a gyroscope and an accelerometer.

18. The apparatus of claim 9, wherein the apparatus is at least one of: head-worn display or a head-mounted display (HMD).

19. A non-transitory computer-readable storage medium storing instructions that, when executed, cause one or more processors to:

initiating a wireless connection with a server, wherein the wireless connection is a WiFi Reverse Direction Grant mode connection and the server is an Access Point (AP) on a WiFi network;

determining a pose information of the user;

responsive to receiving a trigger packet from the server, transmitting the pose information to the server over the wireless connection, wherein the trigger packet indicates permission from the server to transmit during the server's transmit opportunity (TXOP), wherein the server provides permission to transmit during the server's TXOP periodically based on a pose information latency limit required for rendering a frame at the server;

receiving the rendered frame from the server over the wireless connection, the rendered frame rendered for display based on the transmitted pose information; and displaying the received rendered frame to the user.

20. The medium of claim 19, wherein the transmitted pose information is a 6 degrees of freedom (6 DoF) pose.

21. The medium of claim 19, wherein the rendered frame is a first view of a three-dimensional Virtual Reality (VR) or Augmented Reality (AR) content for display to the user.

22. The medium of claim 19, wherein the trigger packet is transmitted responsive to determining there is no rendered frame to transmit.

23. The medium of claim 19, wherein the trigger packet is transmitted responsive to needing the pose information to render the frame.

24. The medium of claim 19, wherein the trigger packet is initiated by an application layer module executing on the server.

\* \* \* \* \*